US010498695B2

(12) United States Patent
Suyama

(10) Patent No.: US 10,498,695 B2
(45) Date of Patent: Dec. 3, 2019

(54) COMMAND DATA TRANSMISSION DEVICE, LOCAL AREA DEVICE, APPARATUS CONTROL SYSTEM, METHOD FOR CONTROLLING COMMAND DATA TRANSMISSION DEVICE, METHOD FOR CONTROLLING LOCAL AREA DEVICE, APPARATUS CONTROL METHOD, AND PROGRAM

(71) Applicant: Yamaha Corporation, Hamamatsu-shi, Shizuoka (JP)

(72) Inventor: Akihiko Suyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/908,379

(22) Filed: Feb. 28, 2018

(65) Prior Publication Data
US 2018/0191670 A1 Jul. 5, 2018

Related U.S. Application Data

(63) Continuation of application No. PCT/JP2016/089215, filed on Dec. 29, 2016.

(51) Int. Cl.
*H04L 29/12* (2006.01)
*H04L 12/28* (2006.01)
(Continued)

(52) U.S. Cl.
CPC ......... *H04L 61/2514* (2013.01); *G10L 15/22* (2013.01); *H04L 12/2836* (2013.01);
(Continued)

(58) Field of Classification Search
CPC ............ H04L 61/2514; H04L 12/2836; H04L 12/4625; H04L 61/103; H04L 61/256; H04L 67/125
See application file for complete search history.

(56) References Cited

U.S. PATENT DOCUMENTS

2012/0077545 A1* 3/2012 Kim ...................... H04W 80/04
2016/0291925 A1 10/2016 Kohara et al.
2017/0164065 A1* 6/2017 Aggarawal ........ H04N 21/6332

FOREIGN PATENT DOCUMENTS

JP 2001-128262 A 5/2001
JP 2004-15627 A 1/2004
(Continued)

OTHER PUBLICATIONS

Japanese-language International Search Report (PCT/ISA/210) issued in PCT Application No. PCT/JP2016/089215 with English translation dated Mar. 28, 2017 (four (4) pages).
(Continued)

*Primary Examiner* — Ronald B Abelson
(74) *Attorney, Agent, or Firm* — Crowell & Moring LLP

(57) ABSTRACT

A command data transmission device receives an operation instruction to an apparatus installed in a local area, generates command data representing a command to be transmitted to the apparatus to cause the apparatus in order to perform an operation corresponding to the operation instruction and an address for transmitting the command to the apparatus via a transmission method in the local area; and transmits the generated command data to a local area device installed in the local area via a wide area network.

22 Claims, 13 Drawing Sheets

(51) Int. Cl.
 *H04L 12/46* (2006.01)
 *H04L 29/08* (2006.01)
 *G10L 15/22* (2006.01)

(52) U.S. Cl.
 CPC ........ *H04L 12/4625* (2013.01); *H04L 61/103* (2013.01); *H04L 61/256* (2013.01); *H04L 67/125* (2013.01); *G10L 2015/223* (2013.01); *H04L 67/025* (2013.01)

(56) References Cited

FOREIGN PATENT DOCUMENTS

| | | | |
|---|---|---|---|
| JP | 2005-109763 A | 4/2005 | |
| JP | 2015-100085 A | 5/2015 | |
| JP | 2015-106358 A | 6/2015 | |

OTHER PUBLICATIONS

Japanese-language Written Opinion (PCT/ISA/237) issued in PCT Application No. PCT/JP2016/089215 with English translation dated Mar. 28, 2017 (six (6) pages).
International Search Report (PCT/ISA/210) issued in PCT Application No. PCT/JP2018/042864 dated Jan. 8, 2019 (four (4) pages).
Japanese-language Written Opinion (PCT/ISA/237) issued in PCT Application No. PCT/JP2018/042864 dated Jan. 8, 2019 (three (3) pages).

* cited by examiner

FIG.2

C1 — http://192.168.0.2/ctrl?power=on

C2 — http://192.168.0.2/ctrl?input=aux

C3 — http://192.168.0.2/ctrl?volume=40

C4 — http://192.168.0.2/ctrl?cmd=getdeviceinfo

C5 — http://192.168.0.3/ctrl?power=on

C6 — http://192.168.0.3/ctrl?cmd=play

C7 — http://192.168.0.3/ctrl?cmd=getdeviceinfo

FIG.3

USER ID : U2

USER ID : U1

| ID | NAME | MACHINE MODEL | MAC ADDRESS | IP ADDRESS | COMMAND TYPE | TERMINAL | VOLUME RANGE | CONNECTION DESTINATION | RECEIVA-BILITY | SUBSTITUTE APPARATUS |
|---|---|---|---|---|---|---|---|---|---|---|
| 1 | AVR (FIRST APPARATUS) | — | aabbccddee11 | 192.168.0.2 | — | AUX HDMI1 HDMI2 HDMI3 | 100 | | 1 | |
| 2 | Piano (SECOND APPARATUS) | — | aabbccddee22 | 192.168.0.3 | — | — | — | aabbccddee11 AUX | 0 | aabbccddee11 |
| 3 | TV (THIRD APPARATUS) | — | aabbccddee33 | 192.168.0.4 | — | — | — | aabbccddee11 HDMI1 | 0 | aabbccddee11 |
| 4 | BD Player (FOURTH APPARATUS) | — | aabbccddee44 | 192.168.0.5 | — | — | — | aabbccddee11 HDMI2 | 0 | aabbccddee11 |
| 5 | living room | — | aabbccddee55 | 192.168.0.6 | — | — | — | | 1 | |
| ... | ... | ... | ... | ... | ... | ... | ... | ... | ... | ... |

D1
```
{
  "type":"cmd",
  "id":1,
  "command":{
    "ip":"192.168.0.2",
    "path":"/ctrl?power=on",
    "method":"GET"
  }
}
```

D2
```
{
  "type":"cmd",
  "id":5,
  "command":{
    "ip":"192.168.0.3",
    "path":"/ctrl?power=on",
    "method":"GET"
  }
}
```

D3
```
{
  "type":"cmd",
  "id":1,
  "command":{
    "ip":"192.168.0.2",
    "path":"/ctrl",
    "body":"<Power>On</Power>",
    "method":"POST"
  }
}
```

FIG.7

```
{
  "type":"array",
  "id":0,
  "array":[
    {
      "type":"cmd",
      "id":1,
      "command":{
        "ip":"192.168.0.2",
        "path":"/ctrl?power=on",
        "method":"GET"
      }
    },
    {
      "type":"delay",
      "id":2,
      "time":500
    },
    {
      "type":"cmd",
      "id":3,
      "command":{
        "ip":"192.168.0.2",
        "path":"/ctrl?input=aux",
        "method":"GET"
      }
    },
    ........
    {
      "type":"cmd",
      "id":6,
      "command":{
        "ip":"192.168.0.3",
        "path":"/ctrl?cmd=play",
        "method":"GET"
      }
    }
  ]
}
```

D5
```
{
  "type":"cmd",
  "id":10,
  "command":{
    "ip":"192.168.0.2",
    "path":"/ctrl?cmd=getdeviceinfo",
    "method":"GET"
  }
}
```

D6
```
{
  "type":"response",
  "id":10,
  "response":{
    "response_code":0
    "model" :"AAA"
    .....
  }
}
```

FIG.9

USER ID : U2

USER ID : U1

| ID | KEYWORD | COMMAND INFORMATION | | |
| --- | --- | --- | --- | --- |
| | | ORDER | TARGET APPARATUS | CONTENT OF COMMAND |
| 1 | Dinner | 1 | AVR | ON |
| | | 2 | | DELAY 500ms |
| | | 3 | AVR | INPUT HDMI1 |
| | | 4 | AVR | VOLUME 40 |
| | | ... | ... | ... |
| 2 | Morning | 1 | --- | --- |
| | | ... | ... | ... |
| ... | ... | ... | ... | ... |

T2

COMMAND DATA TRANSMISSION DEVICE, LOCAL AREA DEVICE, APPARATUS CONTROL SYSTEM, METHOD FOR CONTROLLING COMMAND DATA TRANSMISSION DEVICE, METHOD FOR CONTROLLING LOCAL AREA DEVICE, APPARATUS CONTROL METHOD, AND PROGRAM

CROSS-REFERENCE TO RELATED APPLICATION

The present disclosure contains subject matter related to that disclosed in International Paten Application PCT/JP 2016/089215 filed in the Japan Patent Office on Dec. 29, 2016, the entire contents of which are hereby incorporated by reference.

BACKGROUND OF THE INVENTION

Technical Field

The present invention relates to a command data transmission device, a local area device, an apparatus control system, a command data transmission method, a method for controlling a local area device, an apparatus control method, and a program.

Background Art

An apparatus is known which receives a command transmitted via a local area network (LAN) and performs an operation corresponding to the command (JP2015-100085A). Such an apparatus can be controlled via the LAN.

SUMMARY OF INVENTION

Technical Problem

Generally, it is often the case that a private IP address that is effective only within the local area is set for an apparatus as described above. To the apparatus for which a private IP address is set, a command cannot be directly transmitted via the internet (wide area network). Therefore, the apparatus cannot be controlled via the internet, using the command.

In view of the above problem, an object of the invention is to provide a command data transmission device, a local area device, an apparatus control system, a method for controlling a command data transmission device, a method for controlling a local area device, an apparatus control method, and a program which enable controlling an apparatus via a wide area network such as the internet, using a command used in a local area.

Solution to Problem

To solve the above problem, a command data transmission device according to one embodiment of the invention includes: at least one processor; and at least one memory that stores a plurality of instructions, which when executed by the at least one processor, cause the at least one processor to: receive an operation instruction to an apparatus installed in a local area; generate command data representing a command to be transmitted to the apparatus to cause the apparatus in order to perform an operation corresponding to the operation instruction and an address for transmitting the command to the apparatus via a transmission method in the local area; and transmit the generated command data to a local area device installed in the local area via a wide area network.

A local area device according to one embodiment of the invention includes: at least one processor; and at least one memory that stores a plurality of instructions, which when executed by the at least one processor, cause the at least one processor to: receive command data via a wide area network, the command data representing an address to which a command is to be transmitted via a transmission method in a local area and the command to be transmitted to the address via the transmission method; and transmit the command to the address via the transmission method, based on the command data.

An apparatus control system according to one embodiment of the invention includes: a command data transmission device capable of transmitting command data via a wide area network, the command data transmission device being configured to: receive an operation instruction to an apparatus installed in a local area; generate command data based on the operation instruction, the command data representing a command to be transmitted to the apparatus in order to cause the apparatus to perform an operation corresponding to the operation instruction and an address for transmitting the command to the apparatus via a transmission method in the local area; and transmit the generated command data to a local area device installed in the local area via a wide area network; and the local area device being configured to: receive the command data via the wide area network; and transmit the command to the address via the transmission method, based on the command data.

A command data transmission method according to one embodiment of the invention includes: receiving an operation instruction to an apparatus installed in a local area; generating command data based on the operation instruction, the command data representing a command to be transmitted to the apparatus in order to cause the apparatus to perform an operation corresponding to the operation instruction and an address for transmitting the command to the apparatus via a transmission method in the local area; and transmitting the generated command data to a local area device installed in the local area via a wide area network.

A method for controlling a local area device according to one embodiment of the invention includes: receiving command data via a wide area network, the command data representing an address to which a command is to be transmitted via a transmission method in a local area and the command to be transmitted to the address via the transmission method; and transmitting the command to the address via the transmission method, based on the command data.

An apparatus control method according to one embodiment of the invention includes: receiving, by a command data transmission device, an operation instruction to an apparatus installed in a local area; and generating, by the command data transmission device, command data based on the operation instruction, the command data representing a command to be transmitted to the apparatus in order to cause the apparatus to perform an operation corresponding to the operation instruction and an address for transmitting the command to the apparatus via a transmission method in the local area; transmitting, by the command data transmission device, the generated command data to a local area device installed in the local area via a wide area network; receiving, by the local area device, the command data via the wide area network; and transmitting, by the local area device, the command to the address via the transmission method, based on the command data.

A program according to one embodiment of the invention causes a computer to: receive an operation instruction to an apparatus installed in a local area; generate command data based on the operation instruction, the command data representing a command to be transmitted to the apparatus in order to cause the apparatus to perform an operation corresponding to the operation instruction and an address for transmitting the command to the apparatus via a transmission method in the local area; and transmit the generated command data to a local area device installed in the local area via a wide area network. An information storage medium according to one embodiment of the invention is a non-transitory computer-readable information storage medium in which the above program is recorded.

A program according to one embodiment of the invention causes a computer to: receive command data via a wide area network, the command data representing an address to which a command is to be transmitted via a transmission method in a local area and the command to be transmitted to the address via the transmission method; and transmit the command to the address via the transmission method, based on the command data. An information storage medium according to one embodiment the invention is a non-transitory computer-readable information storage medium in which the above program is recorded.

BRIEF DESCRIPTION OF DRAWINGS

FIG. 2 is a view showing examples of commands.

FIG. 3 is a view showing an example of an apparatus table.

FIG. 5 is a view showing an example of command data.

FIG. 7 is a view showing an example of array command data.

FIG. 8 is a view showing an example of command data and response data.

FIG. 9 is a view showing an example of a keyword command table.

DESCRIPTION OF EMBODIMENTS

Hereinafter, an example of embodiment of the invention will be described, based on the drawings.

Figure 1:
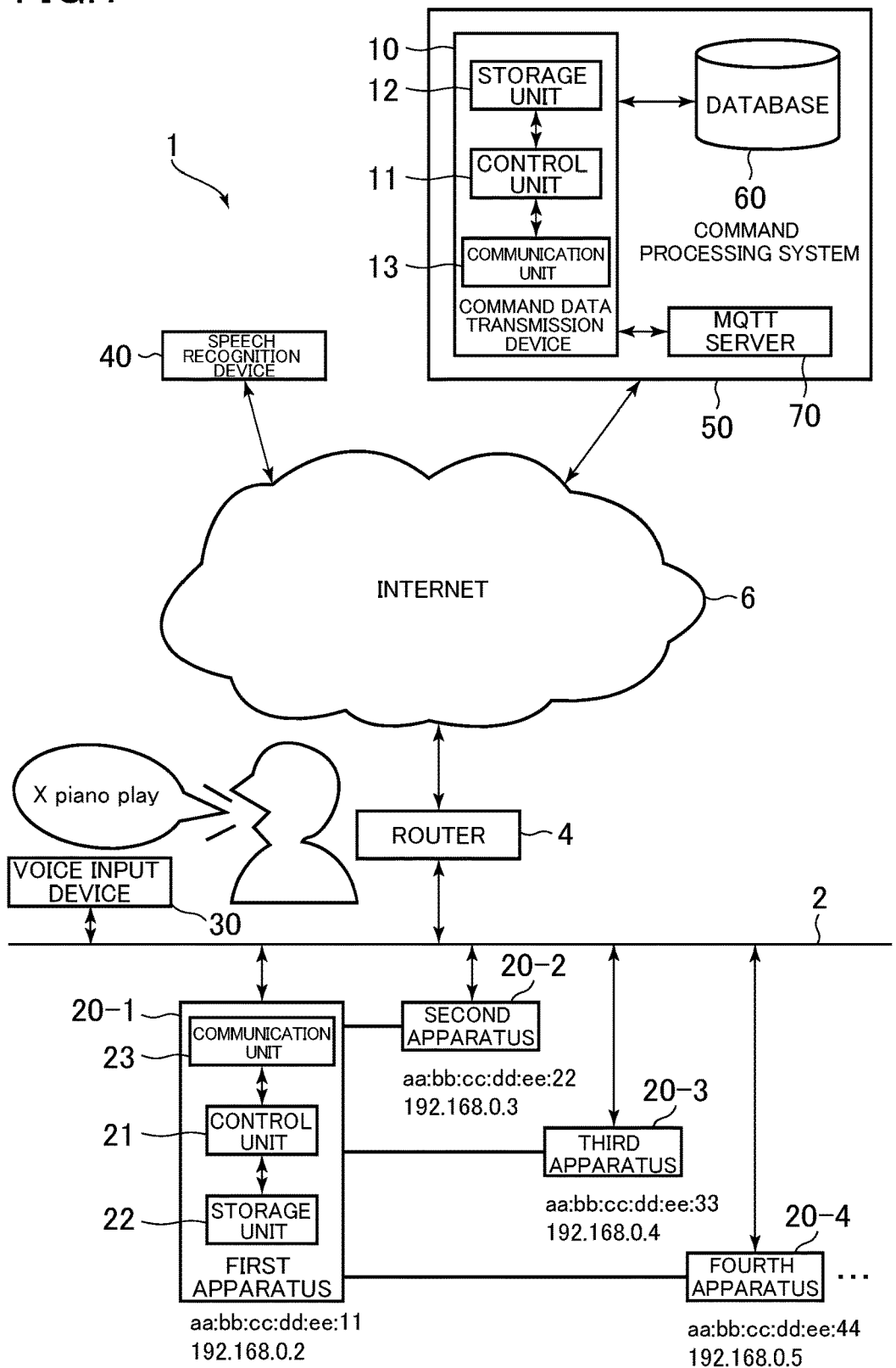
FIG. 1 is a view showing the configuration of an apparatus control system according to an embodiment of the invention.

[1. System Configuration] FIG. 1 shows the configuration of an apparatus control system according to an embodiment of the invention. As shown in FIG. 1, an apparatus control system 1 includes a first apparatus 20-1, a second apparatus 20-2, a third apparatus 20-3, a fourth apparatus 20-4, a voice input device 30, a speech recognition device 40, and a command processing system 50. In the description below, the first apparatus 20-1, the second apparatus 20-2, the third apparatus 20-3, and the fourth apparatus 20-4 may be described with a general term "apparatus 20".

The apparatuses 20 and the voice input device 30 are installed in a local area and connected to a LAN 2. The LAN 2 may be a wired LAN or wireless LAN. The LAN 2 is connected to the internet 6 (wide area network) via a router 4. The speech recognition device 40 and the command processing system 50 are installed outside the local area. That is, the speech recognition device 40 and the command processing system 50 are installed on the side of the internet 6, as viewed from the apparatuses 20 and the voice input device 30. The "local area" is a limited area where communication via the LAN 2 is available. Meanwhile, the "wide area" is an area which includes an area outside the local area and where communication via the internet 6 is available.

The apparatuses 20 are apparatuses to be controlled by the apparatus control system 1. In FIG. 1, only four apparatuses 20 are shown. However, five or more apparatuses 20 may be included. Also, only three or fewer apparatuses 20 may be included.

For example, each apparatus 20 is an audio apparatus or audio-visual apparatus. Specifically, each apparatus 20 is an AV receiver, AV amplifier, speaker, optical disc reproducing apparatus (Blu-ray (trademark registered) player or DVD (trademark registered) player or the like), or television receiver. Further, for example, each apparatus 20 maybe a musical instrument (electronic musical instrument or electric musical instrument or the like). The apparatuses 20 maybe other apparatuses than these.

In the description below, as an example, it is assumed that the first apparatus 20-1 is an AV receiver, the second apparatus 20-2 is an electronic piano having an automatic performance function (the function of automatically performing music by reproducing movements on the keyboard and pedals based on data), the third apparatus 20-3 is a television receiver, and the fourth apparatus 20-4 is a Blu-ray disc player. The second apparatus 20-2 is connected to an external input terminal of the first apparatus 20-1 via an audio cable. The third apparatus 20-3 is connected to a first HDMI (High-Definition Multimedia Interface (trademark registered)) terminal (HDMI1) of the first apparatus 20-1 via an HDMI cable. The fourth apparatus 20-4 is connected to a second HDMI terminal (HDMI2) of the first apparatus 20-1 via an HDMI cable. The first apparatus 20-1 has a MAC address "aa:bb:cc:dd:ee:11". The first apparatus 20-1 has a private IP address "192.168.0.2" set thereon. The second apparatus 20-2 has a MAC address "aa:bb:cc:dd:ee:22". The second apparatus 20-2 has a private IP address "192.168.0.3" set thereon. The third apparatus 20-3 has a MAC address "aa:bb:cc:dd:ee:33". The third apparatus 20-3 has a private IP address "192.168.0.4" set thereon. The fourth apparatus 20-4 has a MAC address "aa:bb:cc:dd:ee:44". The fourth apparatus 20-4 has a private IP address "192.168.0.5" set thereon.

As shown in FIG. 1, the first apparatus 20-1 includes a control unit 21, a storage unit 22, and a communication unit 23. The control unit 21 includes at least one microprocessor (CPU) and executes processing according to a program stored in the storage unit 22. The storage unit 22 includes a main storage unit (for example, a RAM) and an auxiliary storage unit (for example, a non-volatile semiconductor memory, hard disk drive, or solid-state drive). The storage unit 22 is to store programs and data. The communication unit 23 is to send and receive data to and from other devices. Although not illustrated in FIG. 1, the second apparatus 20-2, the third apparatus 20-3, and the fourth apparatus 20-4 similarly include a control unit 21, a storage unit 22, and a communication unit 23.

Each apparatus 20 may have a component (for example, an optical disc drive or memory card slot or the like) for reading a program and data stored in an information storage medium (for example, an optical disc or memory card). The apparatus 20 may be supplied with the program via the information storage medium. The apparatus 20 may also be supplied with the program via the internet 6.

The apparatus 20 receives a command transmitted via the LAN 2 (an example of transmitting means in a local area) and performs an operation corresponding to this command. Therefore, the apparatus 20 can be controlled via the LAN 2. That is, transmitting a command to the apparatus 20 from a terminal such as a smartphone or tablet computer via the LAN 2 makes it possible to cause the apparatus 20 to perform an operation corresponding to this command.

FIG. 2 shows examples of commands. Commands C1 to C4 shown in FIG. 2 are examples of commands to the first apparatus 20-1 (AV receiver). Commands C5 to C7 are examples of commands to the second apparatus 20-2 (electronic piano).

The commands shown in FIG. 2 use the HTTP protocol. A URL is set as each of the commands. In the case of the example shown in FIG. 2, a command is transmitted to the first apparatus 20-1 or the second apparatus 20-2 in the form of an HTTP request. The first apparatus 20-1 or the second apparatus 20-2, where an HTTP daemon is started up, accepts an HTTP request and executes processing corresponding to the HTTP request. Then, the apparatus sends back an HTTP response showing the result of the processing to the source of the command. A command using the HTTP protocol can also be transmitted to the third apparatus 20-3 and the fourth apparatus 20-4.

The command C1 is a command to activate (start up) the first apparatus 20-1 from a standby state (non-active state). The "standby state" is a state where power consumption is less than in a normal state (active state). That is, the standby state is not a state where power is completely off. Even in the standby state, a network communication function or the like is effective, making it possible to receive command data, execute (transmit) a command, or receive a command.

The command C2 is a command to switch the input of the first apparatus 20-1 to an external input. For example, the first apparatus 20-1 (AV receiver) has a plurality of input terminals (for example, HMDI terminals or external input terminals or the like) and a plurality of apparatuses 20 including the second apparatus 20-2 are connected to the plurality of input terminals. Also, a speaker (an example of sound emitting means) is connected to the first apparatus 20-1 and the first apparatus 20-1 causes an audio signal inputted from one of the input terminals to be emitted from the speaker. The command C2 is a command to switch the audio signal supplied to the speaker, to the audio signal inputted from the external input terminal.

The command C3 is a command to set the output volume. The command C4 is a command to request apparatus information of the first apparatus 20-1. When the command C4 is executed, the apparatus information (machine model name or current state information or the like) of the first apparatus 20-1 is sent back to the source of the command C4.

The command C5 is a command to activate the second apparatus 20-2 from the standby state. The command C6 is a command to start automatic performance of the second apparatus 20-2 (electronic piano). The command C7 is a command to request apparatus information of the second apparatus 20-2. The format of the command may be the same or different between the second apparatus 20-2 and the first apparatus 20-1. The format of the command may be the same or different between the first apparatus 20-1, the second apparatus 20-2, the third apparatus 20-3, and the fourth apparatus 20-4.

The voice input device 30 includes a microphone and thus receives a voice input. In this embodiment, the voice input device 30 is used by the user to make a voice input of an operation instruction to the apparatus 20. For example, when the user wants an electronic piano made by company X to carry out automatic performance, the user inputs "X piano play" or the like to the voice input device 30. Further, for example, when the user wants an audio system made by company X installed in the living room to play music, the user input "X play in living room" or the like to the voice input device 30.

Audio data representing the voice (operation instruction) inputted to the voice input device 30 is transmitted with a user ID to the speech recognition device 40 via the internet 6. The speech recognition device 40 is realized, for example, by a server computer. The speech recognition device 40 executes speech recognition processing and thus converts the audio data into data in a format that can be easily understood by a program (command processing system 50). For example, the speech recognition device 40 converts the audio data into text data in a predetermined format. Then, the operation instruction converted into the text data is transmitted with the user ID to the command processing system 50. The user ID may be provided by one of the devices (processing) on the internet side by the time the audio data is transmitted to the command processing system 50.

If different command processing systems 50 are prepared corresponding to individual manufacturers of the apparatus 20, an operation instruction to the apparatus 20 made by company X is transmitted to the command processing system 50 for the apparatus 20 made by company X. If different command processing systems 50 are prepared corresponding to individual formats of commands, an operation instruction to an apparatus 20 is transmitted to the command processing system 50 for the format of commands employed by this apparatus 20.

As shown in FIG. 1, the command processing system 50 includes a command data transmission device 10, a database 60, and an MQTT (message queueing telemetry transport) server 70.

The database 60 stores various data. For example, the database 60 stores information of the apparatus 20 owned by each user. FIG. 3 shows an example of an apparatus table stored in the database 60. An apparatus table T1 is stored for each user (associated with the user ID). The user ID used in the command processing system 50 (database 60) may be different from or the same as the user ID used in the voice input device 30 and the speech recognition device 40. However, if these user IDs are different from each other, correspondence data for converting these user IDs needs to be stored in the command processing system 50 or the speech recognition device 40.

As shown in FIG. 3, the apparatus table T1 includes "ID", "name", "machine model", "MAC address", "IP address", "command type", "terminal", "volume range", "connection destination", "receivability", and "substitute apparatus" fields.

The "ID" field shows information to uniquely identify the apparatus 20 owned by each user. In FIG. 3, the first apparatus 20-1 corresponds to an apparatus ID "1" and the second apparatus 20-2 corresponds to an apparatus ID "2".

The "name" field shows the name of the apparatus 20. The name is used by the user to designate a target apparatus 20 of an operation instruction. For the name, an arbitrary name set by the user may be used, or a name set by the manufacturer or the like of the apparatus 20 may be used. The "machine model" field shows the machine model name (model name) of the apparatus 20.

The "MAC address" and "IP address" fields show a MAC address and an IP address that are set on a wired or wireless network interface card provided in the apparatus 20. The "command type" field shows the type (system) of commands used in the apparatus 20. If a command type is defined for each machine type, a table associating machines types with command types may be separately provided and therefore the "command type" field may be omitted from the apparatus table T1. The "terminal" field shows a list of input terminals provided in the apparatus 20. The "volume range" field shows a range of volume that can be set on the apparatus 20. The "connection destination" field shows an input terminal of another apparatus 20 connected to the apparatus 20 in the case where the apparatus 20 is connected the input terminal of another apparatus 20 and where an audio outputted from the apparatus 20 is inputted to another apparatus 20.

The "receivability" field shows whether command data is receivable via the internet 6 or not. The command data will be described later. For example, "0" or "1" is registered in the "receivability" field. "0" indicates that command data cannot be received via the internet 6. "1" indicates that command data can be received via the internet 6. The "substitute apparatus" field shows an apparatus 20 (substitute apparatus) which receives command data in place of the apparatus 20 in the case where the apparatus 20 cannot receive command data via the internet 6.

For example, each user registers the apparatus table T1. The user can register information of the apparatus 20 which the user owns to the apparatus table T1 by accessing the command data transmission device 10 from a terminal. It is also possible to cause information of the apparatus 20 to be transmitted with the user ID to the command processing system 50 (the command data transmission device 10) and registered to the apparatus table T1, when the apparatus 20 connected to the LAN 2 and started up.

The database 60 also stores data other than the apparatus table T1. For example, the database 60 stores data representing the correspondence between operation instructions and commands (in other words, data to convert operation instructions into commands). This data is stored for each command type (system).

The command data transmission device 10 is realized, for example, by a server computer. As shown in FIG. 1, the command data transmission device 10 includes a control unit 11, a storage unit 12, and a communication unit 13. The control unit 11, the storage unit 12, and the communication unit 13 are similar to the control unit 21, the storage unit 22, and the communication unit 23. The command data transmission device 10 may have a component (for example, an optical disc drive or memory card slot or the like) for reading a program and data stored in an information storage medium (for example, an optical disc or memory card or the like). The command data transmission device 10 maybe supplied with the program via the information storage medium. The command data transmission device 10 may also be supplied with the program via the internet 6.

The command data transmission device 10 can access the database 60. The command data transmission device 10 and the database 60 may be realized by a single server computer or by separate server computers.

The command data transmission device 10 receives an operation instruction to an apparatus 20, generates command data based on the operation instruction, and transmits the command data to the apparatus 20 or another apparatus 20 (substitute apparatus).

As will be described later, the command data is transmitted to the apparatus 20 or another apparatus 20 (substitute apparatus) via the MQTT server 70. The MQTT server 70 is to send and receive data, using the MQTT protocol. The command data transmission device 10 and the MQTT server 70 maybe realized by a single server computer or by separate server computers.

[2. Functional Blocks] FIG. 4 shows an example of functional blocks realized by the command data transmission device 10 and the apparatus 20.

Figure 4:
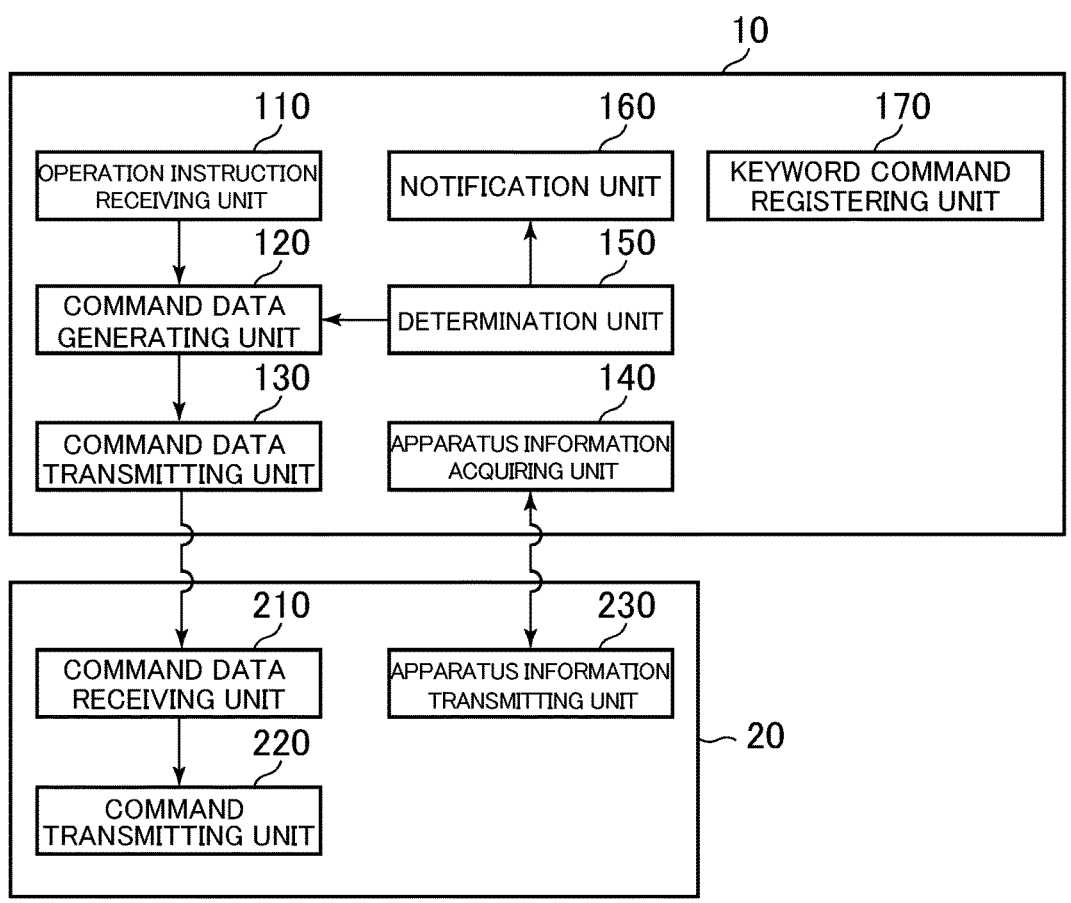
FIG. 4 is a functional block diagram of the apparatus control system.

As shown in FIG. 4, the command data transmission device 10 includes an operation instruction receiving unit 110, a command data generating unit 120, a command data transmitting unit 130, an apparatus information acquiring unit 140, a determination unit 150, a notification unit 160, and a keyword command registering unit 170. These functional blocks are realized, for example, by the control unit 11.

Further, as shown in FIG. 4, the apparatus 20 includes a command data receiving unit 210, a command transmitting unit 220, and an apparatus information transmitting unit 230. These functional blocks are realized, for example, by the control unit 21.

[2-1] First, the operation instruction receiving unit 110, the command data generating unit 120, the command data transmitting unit 130, the command data receiving unit 210, and the command transmitting unit 220 will be described.

The operation instruction receiving unit 110 receives an operation instruction to the first apparatus 20-1 or the second apparatus 20-2. For example, the operation instruction receiving unit 110 receives, from the speech recognition device 40, an operation instruction converted by the speech recognition device 40 into data in a format that can be easily understood by a program, such as text data.

The command data generating unit 120 generates command data representing a command to be transmitted to the first apparatus 20-1 or the second apparatus 20-2 to cause the first apparatus 20-1 or the second apparatus 20-2 to perform an operation corresponding to the operation instruction and an address for transmitting the command to the first apparatus 20-1 or the second apparatus 20-2 via the LAN 2.

FIG. 5 shows an example of command data. Command data D1 shown in FIG. 5 shows an example of command data generated when an operation instruction to the effect that the first apparatus 20-1 is to be started up from the standby state is received. That is, the command data D1 shows an example of command data generated when the command C1 shown in FIG. 2 is executed to the first apparatus 20-1.

The command data D1 includes items "type", "id", and "command". The item "type" indicates the type of the data. In the example shown in FIG. 5, "cmd" is set in the item "type". This indicates that the data is command data. The item "id" indicates identification information to uniquely identify the data (command data). The item "command" indicates the content of the command data. The item "command" includes the items of "ip", "path", and "method". The item "ip" indicates the address of the command. The IP address of the first apparatus 20-1 is set in the item "ip". The item "path" is equivalent to the body of the command. The item "ip" is equivalent to the IP address part of the command C1. The item "path" is equivalent to the part following the IP address, of the command C1. The item "method" indicates the method of the HTTP protocol to be used.

Command data D2 shown in FIG. 5 shows an example of data generated when an operation instruction to the effect that the second apparatus 20-2 is to be started up from the standby state is received. That is, the command data D2 shows an example of command data generated when the command C5 shown in FIG. 2 is to be executed to the second apparatus 20-2. Similarly to the command data D1, the command data D2 includes items "type", "id", and "command". In the command data D2, the IP address of the second apparatus 20-2 is set in the item "ip". In the command data D2, the item "ip" is equivalent to the IP address part of the command C5. The item "path" is equivalent to the part following the IP address, of the command C5.

While the command data D1, D2 show the case of using the GET method of the HTTP protocol, the POST method may be used. If the POST method is used as in command data D3 shown in FIG. 5, the command data includes an item "body" which indicates the content transmitted by the POST method. Further, the command data may include an item "headers" which indicates the content transmitted as HTTP header information. For example, the command data may include an item "headers" such as "headers":["X-HEADER1: INFO1", "X-HEADER2: INFO2"]. This content may be added to the HTTP header and thus transmitted when the command is transmitted.

The command data transmitting unit 130 transmits command data generated by the command data generating unit 120 to a local area device via the internet 6. The "local area device" is a device installed in the local area and a device which can receive data via the internet 6 and can transmit a command to an address via the LAN 2.

For example, the first apparatus 20-1 can receive data transmitted via the internet 6 (see FIG. 3). Therefore, when command data representing a command to the first apparatus 20-1 is generated, the command data transmitting unit 130 transmits the command data to the first apparatus 20-1 (local area device) via the internet 6.

Meanwhile, the second apparatus 20-2 cannot receive data transmitted via the internet 6. Therefore, when command data representing a command to the second apparatus 20-2 is generated, the command data transmitting unit 130 transmits the command data to the first apparatus 20-1 (local area device) registered as a substitute apparatus, via the internet 6.

Figure 6:
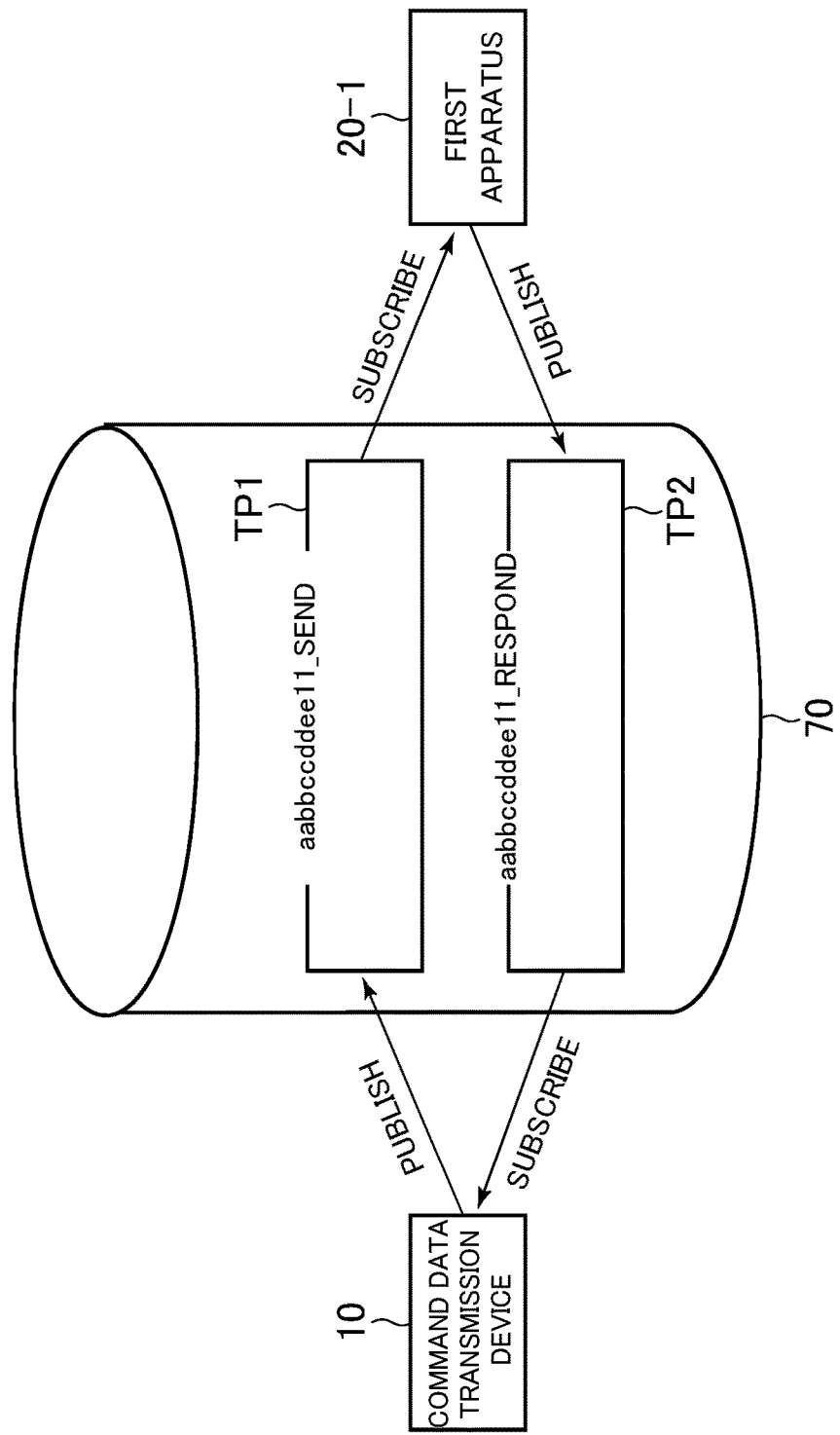
FIG. 6 is a view for explaining an MQTT server.

The command data is transmitted to the local area device, using the MQTT protocol. That is, the command data transmitting unit 130 transmits the command data to the local area device via the MQTT server 70. FIG. 6 is a view for explaining the MQTT server 70. In FIG. 6, it is assumed that the local area device is the first apparatus 20-1.

As shown in FIG. 6, a first topic TP1 is set in the MQTT server 70. The first topic TP1 is a topic for transmitting data from the command data transmission device 10 to the first apparatus 20-1. The identification information (name) of the first topic TP1 is set based on the identification information of the first apparatus 20-1. For example, identification information "aabbccddee11_SEND", which is a combination of the MAC address as the identification information of the first apparatus 20-1 and a letter string "SEND" indicating that this is a topic for transmitting data to the first apparatus 20-1, is set for the first topic TP1.

Further, as shown in FIG. 6, a second topic TP2 is set in the MQTT server 70. The second topic TP2 is a topic for transmitting data (response) from the first apparatus 20-1 to the command data transmission device 10. The identification information (name) of the second topic TP2 is set based on the identification information of the first apparatus 20-1. For example, identification information "aabbccddee11_RESPOND", which is a combination of the MAC address as the identification information of the first apparatus 20-1 and a letter string "RESPOND" indicating that this is a topic for transmitting response to the command data transmission device 10, is set for the second topic TP2.

When transmitting command data to the first apparatus 20-1, the command data transmitting unit 130 publishes the command data in the first topic TP1. In the first topic TP1, the first apparatus 20-1 is registered as a subscriber. The command data published in the first topic TP1 is published to the first apparatus 20-1 subscribing to the first topic TP1. That is, the command data published in the first topic TP1 is transmitted to the first apparatus 20-1. The command data is thus transmitted to the first apparatus 20-1 via the first topic TP1. The reason for providing the second topic TP2 will be described later.

It is now assumed that the operation instruction receiving unit 110 receives an operation instruction to the effect that the electronic piano is to carry out automatic performance. This operation instruction is assumed to be given by a user U1 (user with a user ID "U1").

In this case, the command data generating unit 120, referring to the apparatus table T1 of the user U1, specifies that the electronic piano is the second apparatus 20-2, and acquires information of the second apparatus 20-2.

The command data generating unit 120 specifies another apparatus 20 that needs to operate when causing the second apparatus 20-2 to carry out automatic performance. The second apparatus 20-2 is connected to the external input terminal of the first apparatus 20-1 and an audio outputted from the second apparatus 20-2 is emitted from a speaker via the first apparatus 20-1 (see the "connection destination" field). Therefore, the command data generating unit 120 specifies the first apparatus 20-1 as another apparatus 20 that needs to operate when causing the second apparatus 20-2 to carry out automatic performance. To this end, the command data generating unit 120 generates not only command data representing a command to the second apparatus 20-2 but also command data representing a command to the first apparatus 20-1.

The command data generating unit 120 also understands the type (system) of commands used in the first apparatus 20-1 and the second apparatus 20-2 (see the "command type" or "machine model" field) and thus understands what type (system) of command it should generate command data for. Moreover, the command data generating unit 120 understands that the second apparatus 20-2 cannot receive data via the internet 6 and that the substitute apparatus of the second apparatus 20-2 is the first apparatus 20-1 (see the "receivability" and "substitute apparatus" fields).

The command data generating unit 120 then generates data in which the command data representing the command to the first apparatus 20-1 and the command data representing the command to the second apparatus 20-2 are put together. The command data transmitting unit 130 transmits the data to the first apparatus 20-1 via the MQTT server 70.

In the description below, data in which a plurality of command data are put together is referred to as "array command data".

FIG. 7 shows an example of array command data. Array command data D4 shown in FIG. 7 includes a plurality of command data. In the array command data D4 shown in FIG. 7, "array" is set in an item "type". This means that the data is array command data and includes a plurality of command data. In this case, the array command data D4 includes an item "array" for storing a plurality of command data.

In the example shown in FIG. 7, the item "array" includes element data D41, element data D42, element data D43, and element data D44. The element data D41 is command data to activate the first apparatus 20-1 from the standby state. As previously described, since the second apparatus 20-2 is connected to the first apparatus 20-1, the first apparatus 20-1 needs to activate from the standby state in order to emit the sound made by automatic performance of the second apparatus 20-2 from the speaker. Therefore, the command data to activate the first apparatus 20-1 is included as the element data D41. The element data D41 is similar to the command data D1 shown in FIG. 5.

The element data D42 is wait time data showing that a wait time (delay time) is provided. The activation (startup) of the first apparatus 20-1 takes time. Therefore, in the case of executing a next command to the first apparatus 20-1 after the first apparatus 20-1 is started up, it is necessary to wait for the completion of the activation of the first apparatus 20-1 and then execute the next command. Thus, in order to wait for the completion of the activation of the first apparatus 20-1, the wait time data is included as the element data D42. In the element data D42, "delay" is set in an item "type". This means that the element data D42 is wait time data. The element data D42 includes an item "time". The item "time" shows the wait time. In the example shown in FIG. 7, 500 milliseconds is set in the item "time". A longer time than 500 milliseconds (for example, 2 seconds) may be set as the wait time. Further, a shorter time than 500 milliseconds may be set as the wait time. The wait time may be set in consideration of the time required for the activation of the first apparatus 20-1.

The element data D43 is command data to switch the input of the first apparatus 20-1 to the external input. In order to emit the sound made by automatic performance of the second apparatus 20-2 from the speaker, it is necessary to switch the input of the first apparatus 20-1 to the external input to which the second apparatus 20-2 is connected. Therefore, the command data to switch the input of the first apparatus 20-1 to the external input is included as the element data D43. In the element data D43, the IP address part of the command C2 shown in FIG. 2 is set in an item "ip" and the part following the IP address of the command C2 is set in an item "path".

The element data D44 is command data to cause the second apparatus 20-2 to start automatic performance. In the element data D44, the IP address part of the command C6 shown in FIG. 2 is set in an item "ip" and the part following the IP address of the command C6 is set in an item "path". When the element data D44 is transmitted, command data to designate a piece of music to be performed automatically may be transmitted with the element data D44. In the case of not transmitting this command data, a predetermined piece of music may be automatically set as a target of automatic performance. For example, one of pieces of music that are registered as favorites, or one of pieces of music that have been performed automatically in the past may be automatically set as a target of automatic performance.

Although not illustrated in FIG. 7, in practice, command data to activate the second apparatus 20-2 from the standby state and wait time data to wait for the second apparatus 20-2 to complete the activation are included as element data between the element data D43 and the element data D44.

The command data transmitting unit 130 publishes the array command data D4 in the first topic TP1 of the MQTT server 70. As previously described, the array command data D4 published in the first topic TP1 is published to the first apparatus 20-1 subscribing to the first topic TP1. That is, the array command data D4 is transmitted to the first apparatus 20-1.

The command data receiving unit 210 receives command data via the internet 6. The command transmitting unit 220 transmits a command to an address via the LAN 2, based on the command data.

It is now assumed that the command data receiving unit 210 of the first apparatus 20-1 receives the array command data D4. In this case, the command transmitting unit 220 executes the command data included in the array command data D4 successively from the head.

First, the command transmitting unit 220 executes the command to the first apparatus 20-1 based on the element data D41. That is, the command transmitting unit 220 acquires the command C1 shown in FIG. 2, based on the items "ip" and "path" of the element data D41. The command transmitting unit 220 then accesses the URL that is set as the command C1. In this case, an HTTP request is transmitted to the first apparatus 20-1. Since the IP address of the first apparatus 20-1 itself is set in the item "ip" of the element data D41, the HTTP request is transmitted to the HTTP daemon of the first apparatus 20-1 itself. Consequently, the first apparatus 20-1 is started up from the standby state.

Subsequently, the command transmitting unit 220 waits for the wait time (500 milliseconds) to pass, based on the element data D42. As the wait time has passed, the command transmitting unit 220 executes the command to the first apparatus 20-1 based on the element data D43. That is, the command transmitting unit 220 acquires the command C2 shown in FIG. 2, based on the items "ip" and "path" of the element data D43. The command transmitting unit 220 then accesses the URL that is set as the command C2. In this case, the input of the first apparatus 20-1 is switched to the external input.

Moreover, after that, the command transmitting unit 220 acquires the command C5 shown in FIG. 2, based on the command data not illustrated in FIG. 7, and accesses the URL that is set as the command C5. In this case, the second apparatus 20-2 is started up from the standby state. Further, the command transmitting unit 220 waits for the wait time (for example, 500 milliseconds) to pass, based on the wait time data not illustrated in FIG. 7. As the wait time has passed, the command transmitting unit 220 executes the command to the second apparatus 20-2 based on the element data D44. That is, the command transmitting unit 220 acquires the command C6 shown in FIG. 2, based on the items "ip" and "path" of the element data D44. The command transmitting unit 220 then accesses the URL that is set as the command C6. In this case, an HTTP request is transmitted to the second apparatus 20-2. Consequently, automatic performance of the second apparatus 20-2 is started.

[2-2] Next, the apparatus information acquiring unit 140 and the apparatus information transmitting unit 230 will be described.

The apparatus information acquiring unit 140 acquires the apparatus information of an apparatus 20. The apparatus information acquiring unit 140 generates command data representing a command to cause the apparatus 20 to send back the apparatus information of the apparatus 20 and an address for transmitting the command to the apparatus 20 via LAN 2, and transmits the command data to the local area device via the internet 6. The generation and transmission of the command data, too, may be executed via the command data generating unit 120 and the command data transmitting unit 130.

For example, when acquiring the apparatus information of the first apparatus 20-1, the apparatus information acquiring unit 140 transmits command data D5 shown in FIG. 8 to the first apparatus 20-1 via the internet 6. In the command data D5, the IP address part of the command C4 shown in FIG. 2 is set in an item "ip" and the part following the IP address of the command C4 is set in an item "path".

The apparatus information acquiring unit 140 publishes the command data D5 in the first topic TP1 of the MQTT server 70. The command data D5 is transmitted to the first apparatus 20-1.

The apparatus information transmitting unit 230 sends back the apparatus information of the apparatus 20 to the command data transmission device 10 via the internet 6.

For example, when the first apparatus 20-1 receives the command data D5, the apparatus information transmitting unit 230 acquires the command C4 shown in FIG. 2, based on the command data D5. The apparatus information transmitting unit 230 then accesses the URL that is set as the command C4. In this case, an HTTP request is transmitted to the first apparatus 20-1 and the apparatus information of the first apparatus 20-1 is sent back as an HTTP response. The apparatus information in this case includes machine model information indicating the machine model of the first apparatus 20-1 and current state information indicating the current state of the first apparatus 20-1, or the like.

The apparatus information transmitting unit 230 generates response data representing the acquired machine model information and sends back the response data to the command data transmission device 10 via the internet 6.

For example, response data D6 shown in FIG. 8 is generated. In the response data D6, "response" is set in an item "type". This indicates that this data is response data. In an item "id" of the response data D6, the same ID as the ID "10" set in the item "id" of the command data D5 is set. This indicates that this data is response data to the command data D5.

The response data D6 further includes an item "response". The apparatus information is stored in the item "response". The item "response" includes items "response_code" and "model". In the item "response_code", flag information showing whether the apparatus information is normally acquired or not is set. For example, "0" or "1" is set in the item "response_code". "0" indicates that the apparatus information is normally acquired. "1" indicates that the apparatus information is not normally acquired. In the item "model", the machine model information acquired as a part of the apparatus information is set. Although not illustrated in FIG. 8, the item "response" also includes an element for storing information other than the machine model information.

The apparatus information transmitting unit 230 publishes the response data D6 in the second topic TP2 of the MQTT server 70. Regarding the second topic TP2, the command data transmission device 10 is registered as a subscriber. The response data D6 published in the second topic TP2 is published to the first apparatus 20-1 subscribing to the second topic TP2. That is, the response data D6 published in the second topic TP2 is transmitted to the first apparatus 20-1. The apparatus information acquiring unit 140 receives and acquires the response data D6. The apparatus information acquiring unit 140 thus acquires the apparatus information of the first apparatus 20-1. While the case of acquiring the apparatus information of the first apparatus 20-1 is described here, the apparatus information of the second apparatus 20-2, the third apparatus 20-3, and the fourth apparatus 20-4 can be acquired similarly. Further, while the case of acquiring the apparatus information is described here, information other than the apparatus information may be transmitted to the command data transmission device 10 via the second topic TP2. For example, in the case where the first apparatus 20-1 executes a normal command (activation command or the like) and the result of the execution of the command is sent back to the first apparatus 20-1 as an HTTP response, the result of the execution may be sent back to the command data transmission device 10 as a response via the second topic TP2.

[2-3] Next, the determination unit 150 and the notification unit 160 will be described.

[2-3-1] For example, the determination unit 150 determines whether an apparatus 20 is in a predetermined first state or not, based on the current state information showing the current state of the apparatus 20. If the apparatus 20 is in the first state, the command data generating unit 120 may generate command data representing a command to change the apparatus 20 from the first state to a predetermined second state, and the command data transmitting unit 130 may transmit the command data. Specifically, for example, the determination unit 150 determines whether the apparatus 20 is in the standby state (an example of the first state) or not (whether the apparatus 20 is in the active state or not), based on the current state information. Then, if the apparatus 20 is in the standby state (if the apparatus 20 is not in the active state), the command data generating unit 120 may generate command data representing a command to activate the apparatus 20 from the standby state (command to change the apparatus 20 from the standby state to the active state (an example of the second state), and the command data transmitting unit 130 may transmit the command data.

For example, when generating the array command data D4, the determination unit 150 may determine whether the first apparatus 20-1 is in the active state or not, based on the current state information showing the current state of the first apparatus 20-1.

Then, if the first apparatus 20-1 is not in the active state, the command data generating unit 120 may include command data to activate the first apparatus 20-1 as the element data D41 in the array command data D4. Meanwhile, if the first apparatus 20-1 is in the active state, the command data generating unit 120 need not include the command data to activate the first apparatus 20-1 in the array command data D4. If the command data to activate the first apparatus 20-1 is included, wait time data representing the wait time until the next command is executed (transmitted) may be included after the command data.

Similarly, the determination unit 150 may determine whether the second apparatus 20-2 is in the active state or not, based on the current state information showing the current state of the second apparatus 20-2. Then, if the second apparatus 20-2 is not in the active state, the command data generating unit 120 may include command data to activate the second apparatus 20-2 in the array command data D4. Meanwhile, if the second apparatus 20-2 is in the active state, the command data generating unit 120 need not include the command data to activate the second apparatus 20-2 in the array command data D4. If the command data to activate the second apparatus 20-2 is included, wait time data representing the wait time until the next command is executed (transmitted) may be included after the command data.

[2-3-2] Further, for example, if an operation instruction includes a designation of the volume of sound emitted from the speaker, the determination unit 150 may determine whether the designated volume is higher than a reference volume or not. Then, if the designated volume is higher than the reference volume, the notification unit 160 may notify the user. That is, the notification unit 160 may notify the user that the designated volume is higher than the reference volume, and may inquire of the user whether there is a mistake in the designated volume or not. For example, the notification unit 160 requests the voice input device 30 to display or give an audio output of a notification to inquire of the user whether there is a mistake in the designated volume or not, via the speech recognition device 40 (or without using the speech recognition device 40). In this case, the user voice-inputs a response to the inquiry. If there is no mistake in the designated volume, that effect is voice-inputs. If there is a mistake in the designated volume, a voice input of the correct volume is voice-input anew. The response is supplied to the command data transmission device 10 via the speech recognition device 40. The command data generating unit 120 generates command data to set the volume, based on the response. The command data transmitting unit 130 transmits the command data.

When the designated volume is voice-input, there is a risk that the designated volume might be wrongly recognized. For example, while the user voice-inputs "18" as the designated volume, the designated volume might be recognized as "80", which is similar to "18" in English pronunciation. In this case, a significantly higher volume than the volume intended by the user is set. In view of this, providing the determination unit 150 as described above and setting the reference volume to "50", for example, can prevent sound emission in a high volume that is not intended by the user.

[2-3-3] Further, for example, if no apparatus 20 is specified as the target of the operation instruction, the determination unit 150 may determine whether only one apparatus 20 is installed in the LAN 2 or not. That is, referring to the apparatus table T1 of the user, the determination unit 150 may determine whether only one apparatus 20 is registered in the apparatus table T1 or not. If only one apparatus 20 is installed in the LAN 2, the command data generating unit 120 may regard the one apparatus 20 as the target of the operation instruction. Meanwhile, if a plurality of apparatuses 20 is installed in the LAN 2, the notification unit 160 may notify the user that no apparatus 20 is specified as the target of the operation instruction, and may inquire of the user about the apparatus 20 as the target of the operation instruction. For example, the notification unit 160 may request the voice input device 30 to notify the user that no apparatus 20 is specified as the target of the operation instruction and to inquire of the user about the apparatus 20 as the target of the operation instruction.

[2-4] Next, the keyword command registering unit 170 will be described.

The keyword command registering unit 170 registers a plurality of pieces of command information in association with a single piece of identification information in the database 60 (an example of a storage) in response to a registration request from the user.

For example, the user selects a plurality of pieces of command information for a specific situation such as dinner scene, from among a plurality of pieces of command information displayed on the screen of a terminal such as a smartphone or tablet computer. Specifically, the user selects (1) command information to activate the AV receiver from the standby state, (2) wait information to wait for 500 milliseconds until the execution of the next command, (3) command information to switch the input of the AV receiver to the first HDMI terminal (HDMI1), (4) command information to set the output volume from the AV receiver to "40", (5) command information to activate the television receiver from the standby state, (6) wait information to wait for 500 milliseconds until the execution of the next command, and (7) command information to change the channel of the television receiver to a specific channel, as a plurality of pieces of command information for dinner scene. Alternatively, the user selects (1) command information to activate the AV receiver from the standby state, (2) wait information to wait for 500 milliseconds until the execution of the next command, (3) command information to switch the input of the AV receiver to the external input, (4) command information to activate the electronic piano from the standby state, (5) wait information to wait for 500 milliseconds until the execution of the next command, (6) command information to set a specific piece of music (piece of music suitable for dinner scene) as the piece to be played by the electronic piano, and (7) command information to cause the electronic piano to carry out automatic performance, as a plurality of pieces of command information for dinner scene. The wait information may be inserted according to the selection by the user or may be automatically inserted by the apparatus control system 1.

The user also sets a keyword (identification information) indicating the situation, for example, "dinner" or the like, to the selected plurality of pieces of command information. In this case, a registration request indicating the selected plurality of pieces of command information and the keyword is transmitted from the terminal to the command data transmission device 10. The keyword command registering unit 170 registers the selected plurality of pieces of command information in association with the keyword, in the database 60.

FIG. 9 shows an example of a keyword command table stored in the database 60. A keyword command table T2 is stored for each user (in association with the user ID). In the keyword command table T2, a plurality of pieces of command information selected by the user is stored in associated with a keyword set by the user. In the example shown in FIG. 9, information showing the order, the target apparatus to be the target of the command, and the content of the command, is registered as each piece of command information. The command information is information to acquire command data. Information to be the base for generating command data may be stored as command information. Further, command data itself may be stored as command information.

In this case, as the user gives a voice input of the keyword "Dinner" to the voice input device 30, the voice-inputted keyword "Dinner" is supplied to the command data transmission device 10 via the speech recognition device 40. Then, the command data generating unit 120, referring to the keyword command table T2, acquires a plurality of pieces of command information associated with the keyword "Dinner". The command data generating unit 120 then acquires (generates) command data based on the plurality of pieces of command information. The command data transmitting unit 130 transmits the command data to the apparatus 20 via the MQTT server 70. In this case, the command data generating unit 120 may acquire a plurality of command data and the command data transmitting unit 130 may transmit the plurality of command data, one by one. Further, the command data generating unit 120 may generate array command data obtained by putting together a plurality of command data and the command data transmitting unit 130 may transmit the array command data.

[3. Processing] The processing executed in the apparatus control system 1 will be described.

Figure 10:
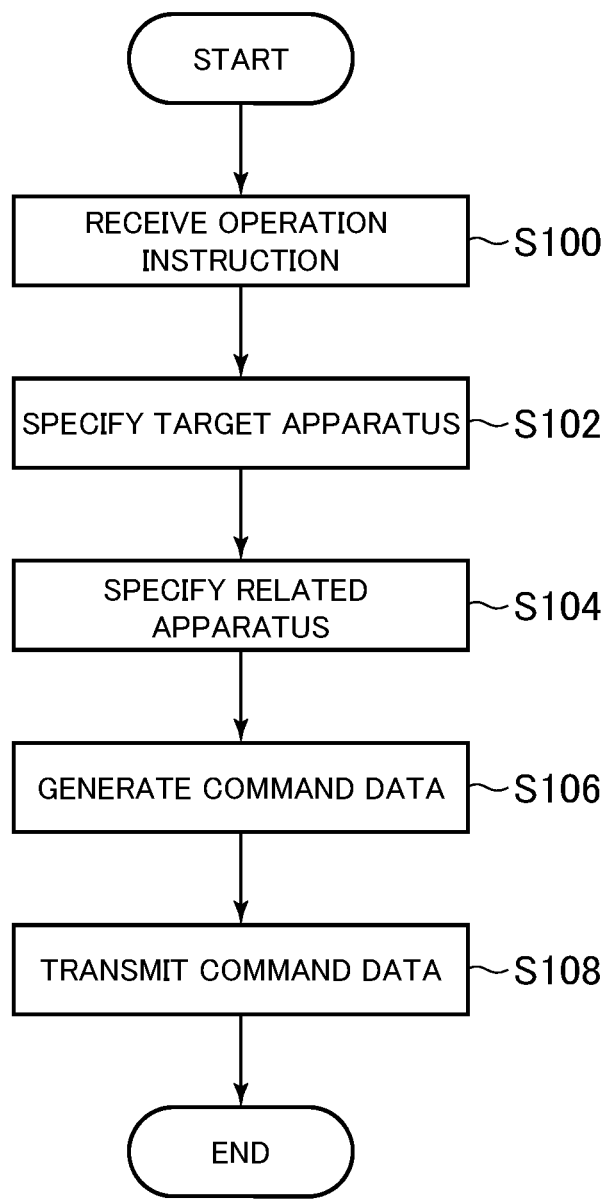
FIG. 10 is a view showing processing executed in the apparatus control system.

[3-1] FIG. 10 shows an example of the processing executed when an operation instruction converted into text data is transmitted with a user ID to the command data transmission device 10. The control unit 11 executes the processing shown in FIG. 10 according to a program and thus functions as the operation instruction receiving unit 110, the command data generating unit 120, and the command data transmitting unit 130. In the description below, the processing shown in FIG. 10 will be described on the assumption that an operation instruction to designate automatic performance of the electronic piano is received with the user ID "U1".

As shown in FIG. 10, first, the control unit 11 receives an operation instruction (S100). The control unit 11 then specifies a target apparatus (S102). That is, the control unit 11 specifies an apparatus 20 to be the target of the operation instruction, referring to the apparatus table T1 of the user U1. For example, since the electronic piano is the second apparatus 20-2, the control unit 11 determines that the second apparatus 20-2 is the target apparatus.

The control unit 11 also specifies a related apparatus (S104). That is, the control unit 11, referring to the apparatus table T1 of the user U1, specifies another apparatus 20 that needs to operate when the target apparatus carries out an operation corresponding to the operation instruction. For example, the second apparatus 20-2 is connected to the external input terminal of the first apparatus 20-1, and a sound outputted from the second apparatus 20-2 is emitted from the speaker via the first apparatus 20-1. Therefore, the control unit 11 specifies the first apparatus 20-1 as the related apparatus.

Subsequently, the control unit 11 generates command data to control the target apparatus and the related apparatus (S106).

For example, the control unit 11 generates command data to cause the first apparatus 20-1 to carry out an operation which the first apparatus 20-1 needs to carry out when the second apparatus 20-2 carries out automatic performance. Specifically, the control unit 11 generates command data to activate the first apparatus 20-1 from the standby state (element data D41) and command data to switch the input of the first apparatus 20-1 to the external input (element data D43). Regarding command data in which a wait time needs to be set, such as the command data to activate the first apparatus 20-1, wait time data (element data D42) is inserted. In this case, whether the first apparatus 20-1 is in the standby state or not may be determined, and the command data to activate the first apparatus 20-1 from the standby state (element data D41) and the wait time data (element data D42) may be generated only when the first apparatus 20-1 is in the standby state.

The control unit 11 also generates command data to cause the second apparatus 20-2 to carry out automatic performance. Specifically, the control unit 11 generates command data to activate the second apparatus 20-2 from the standby state, wait time data to set a wait time, and command data to cause the second apparatus 20-2 to start automatic performance (element data D44). In this case, whether the second apparatus 20-2 is in the standby state or not may be determined, and the command data to activate the second apparatus 20-2 from the standby state and the wait time data may be generated only when the second apparatus 20-2 is in the standby state.

Subsequently, the control unit 11 transmits the command data (S108).

For example, the control unit 11 determines whether the target apparatus is in the state of being able to receive data via the internet 6 or not, referring to the apparatus table T1 of the user U1. If the target apparatus is in the state of being able to receive data via the internet 6, the control unit 11 transmits the command data for the target apparatus to the target apparatus via the MQTT server 70. That is, the control unit 11 publishes the command data in a topic for transmission to the target apparatus.

Meanwhile, if the target apparatus is not in the state of being able to receive data via the internet 6, the control unit 11 specifies the substitute apparatus of the target apparatus, referring to the apparatus table T1 of the user U1, and transmits the command data for the target apparatus to the substitute apparatus via the MQTT server 70. That is, the control unit 11 publishes the command data in a topic for transmission to the substitute apparatus. If the substitute apparatus is the same as the related apparatus, the control unit 11 puts the command data for the target apparatus and the command data for the related apparatus together into one data (array command data) and publishes this data in the topic. Even if the substitute apparatus is the same as the related apparatus, the control unit 11 may separately publish the command data for the target apparatus and the command data for the related apparatus in the topics, without putting these data together in one data (array command data).

Further, for example, the control unit 11 determines whether the related apparatus is in the state of being able to receive data via the internet 6 or not, referring to the apparatus table T1 of the user U1. If the related apparatus is in the state of being able to receive data via the internet 6, the control unit 11 transmits the command data for the related apparatus to the related apparatus via the MQTT server 70. That is, the control unit 11 publishes the command data in a topic for transmission to the related apparatus.

Meanwhile, if the related apparatus is not in the state of being able to receive data via the internet 6, the control unit 11 specifies the substitute apparatus of the related apparatus, referring to the apparatus table T1 of the user U1, and transmits the command data for the related apparatus to the substitute apparatus via the MQTT server 70. That is, the control unit 11 publishes the command data in a topic for transmission to the substitute apparatus. If the substitute apparatus is the same as the target apparatus, the control unit 11 puts the command data for the target apparatus and the command data for the related apparatus together into one data (array command data) and publishes this data in the topic. Even if the substitute apparatus is the same as the target apparatus, the control unit 11 may separately publish the command data for the target apparatus and the command data for the related apparatus in the topics, without putting these data together in one data (array command data).

Figure 11:
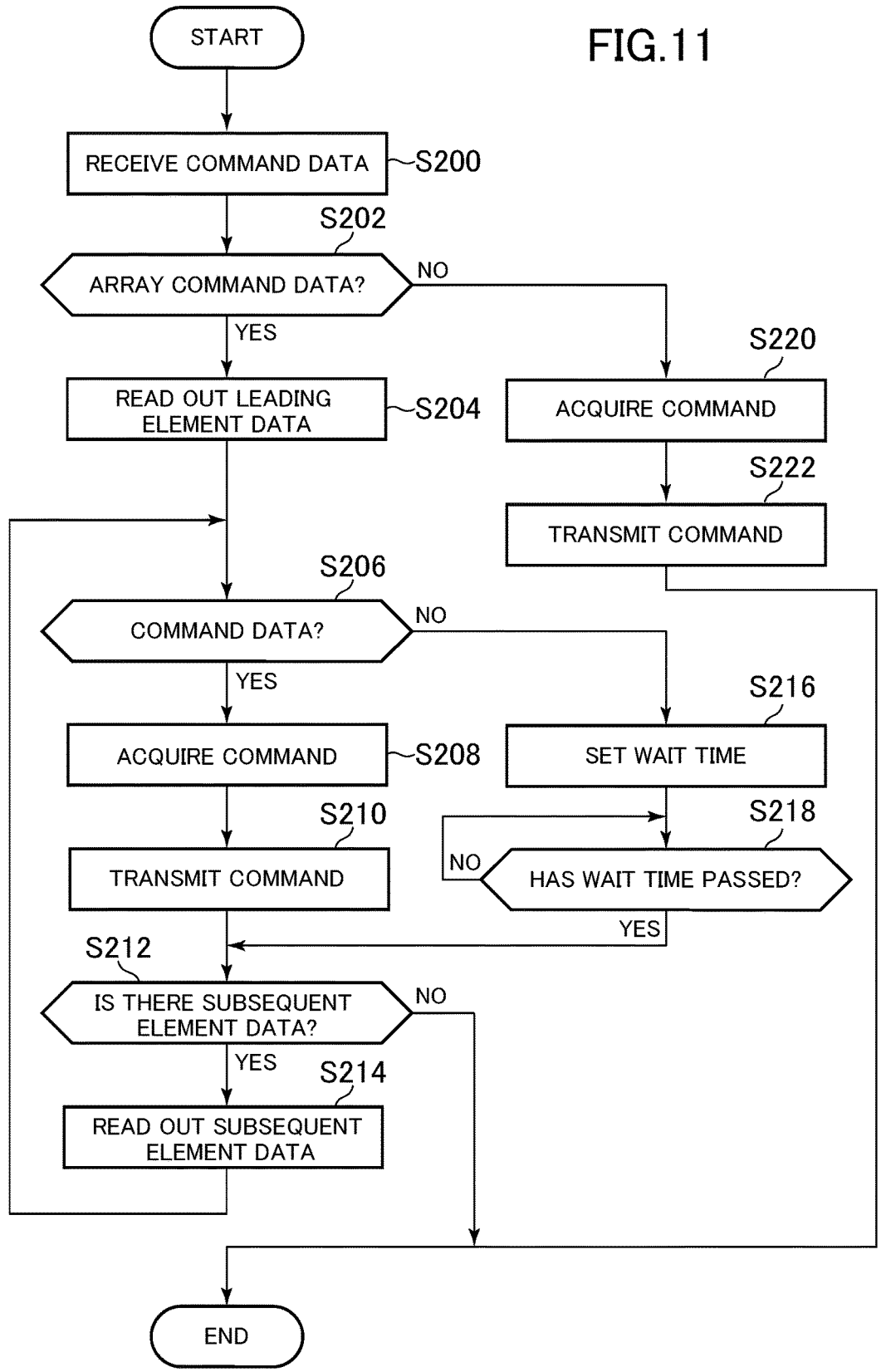
FIG. 11 is a view showing another processing executed in the apparatus control system.

[3-2] FIG. 11 shows an example of the processing when command data is transmitted to the apparatus 20. The control unit 21 executes the processing shown in FIG. 11 according to a program and thus functions as the command data receiving unit 210 and the command transmitting unit 220.

As shown in FIG. 11, first, the control unit 21 receives command data (S200). The control unit 21 then determines whether the received command data is array command data or not (S202). If the received command data is not array command data, that is, if only one command data is received, the control unit 21 acquires a command based on the items "ip" and "path" of the command data (S220) and transmits the command (S222). That is, the control unit 21 accesses a URL acquired as the command. The control unit 21 then ends this processing.

Meanwhile, if the received command data is array command data, the control unit 21 reads out the leading element data from the array command data (S204). The control unit 21 then determines whether this element data is command data or not (S206). If the element data is command data, the control unit 21 acquires a command based on the items "ip" and "path" of the command data (S208) and transmits the command (S210). That is, the control unit 21 accesses a URL generated as the command. Subsequently, the control unit 21 determines whether there is subsequent element data in the array command data or not (S212). If there is subsequent element data in the array command data, the control unit 21 reads out this element data (S214) and executes Step S206.

Meanwhile, if the element data is not command data, for example, if the element data is wait time data, the control unit 21 sets a wait time based on the item "time" of the wait time data (S216). The control unit 21 then monitors whether the wait time has passed or not (S218). If the wait time has passed, the control unit 21 executes Step S212.

If it is determined in Step S212 that there is no subsequent element data in the array command data, the control unit 21 ends this processing. In the above-described processing (S206, S216), it is assumed that the element data included in the array command data is either command data or wait time data (that is, one of "cmd" and "time" is set in the item "type" of the element data).

However, the element data may be other data than the command data and the wait time data. That is, something other than "cmd" and "time" may be set in the item "type" of the element data, thus causing another processing to be executed. Similarly, in the above-described processing (S200, S202, S204), it is assumed that the apparatus 20 receives command data or array command data (that is, one of "cmd" and "array" is set in the item "type" of the data). However, something other than "cmd" and "array" may be set in the item "type" of the data, thus causing another processing to be executed.

Figure 12:
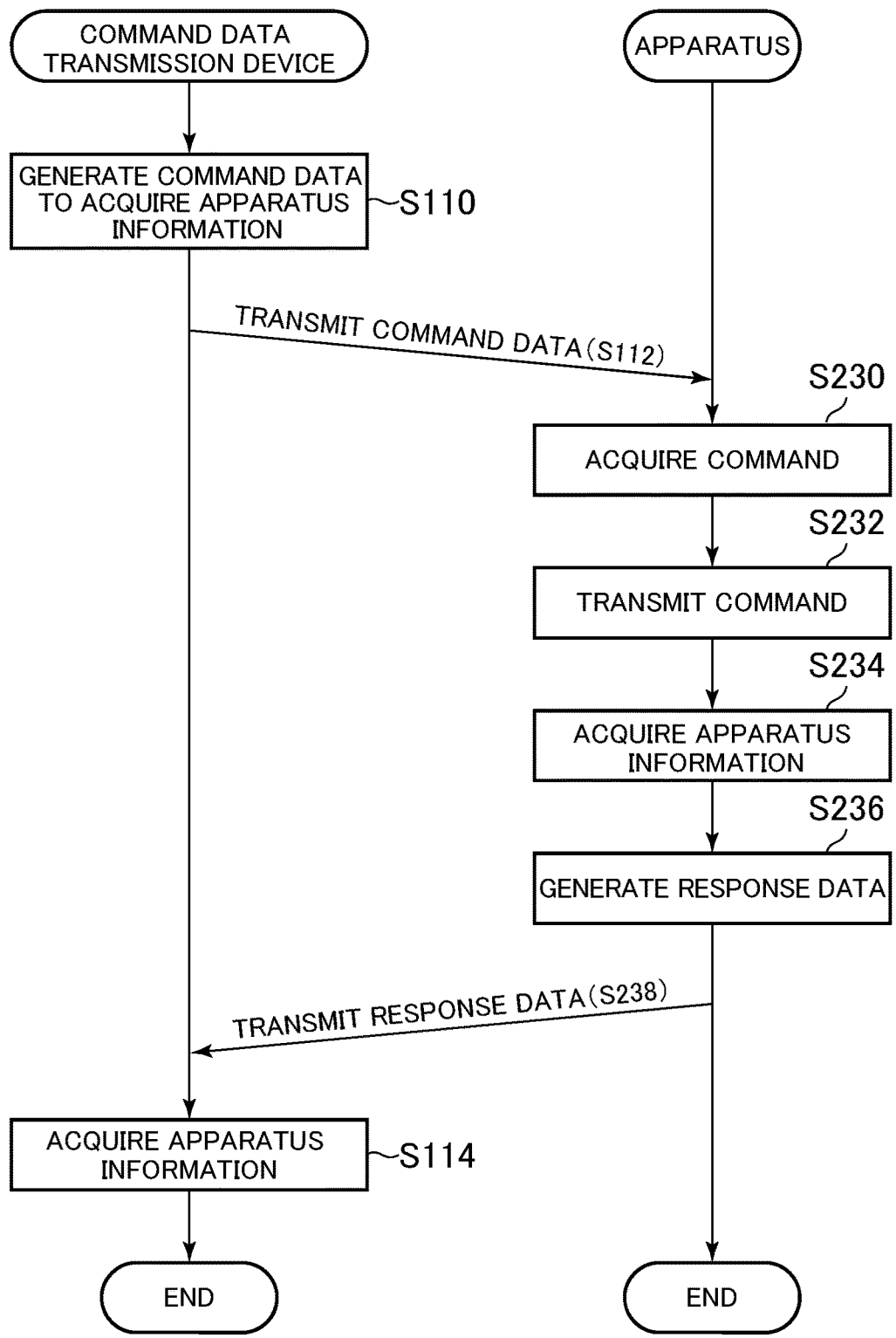
FIG. 12 is a view showing another processing executed in the apparatus control system.

[3-3] FIG. 12 shows an example of the processing executed when the apparatus information of the apparatus 20 is acquired. The control units 11, 21 execute the processing shown in FIG. 12 according to programs. Thus, the control unit 11 functions as the apparatus information acquiring unit 140, and the control unit 21 functions as the information transmitting unit 230.

As shown in FIG. 12, first, the control unit 11 of the command data transmission device 10 generates command data to acquire the apparatus information of the target apparatus (S110). For example, the command data D5 as shown in FIG. 8 is generated. The control unit 11 then transmits the command data (S112). This processing is executed similarly to Step S108.

When the apparatus 20 (target apparatus or substitute apparatus) receives the command data, the control unit 21 of the apparatus 20 acquires a command based on the items "ip" and "path" of the command data (S230) and transmits the command (S232). That is, the control unit 21 accesses a URL acquired as the command.

In this case, an HTTP request is transmitted to the target apparatus. The target apparatus executes processing to send back the apparatus information and sends back the apparatus information as an HTTP response. Consequently, the control unit 21 acquires the apparatus information (S234) and generates response data based on the apparatus information (S236). For example, the response data D6 as shown in FIG. 8 is generated.

The control unit 21 then transmits the response data to the command data transmission device 10 via the MQTT server 70 (S238). That is, the control unit 21 publishes the response data in a topic for transmission to the command data transmission device 10. The published response data is transmitted to the command data transmission device 10.

When the command data transmission device 10 receives the response data, the control unit 11 acquires the apparatus information of the target apparatus from the response data (S114). For example, the acquired apparatus information is registered in the database 60 (apparatus table T1 of the user U1).

Figure 13:
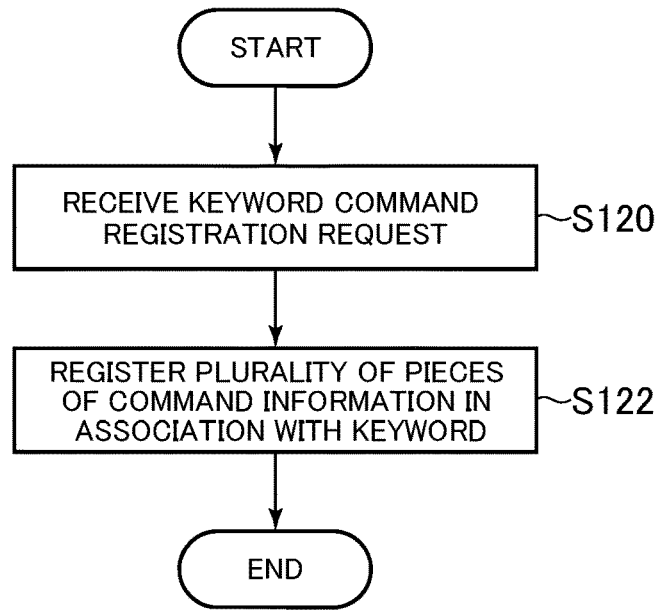
FIG. 13 is a view showing another processing executed in the apparatus control system.

[3-4] FIG. 13 shows an example of the processing executed when a keyword command registration request is transmitted from the user terminal to the command data transmission device 10. The control unit 11 executes the processing shown in FIG. 13 according to a program and thus functions as the keyword command registering unit 170.

As shown in FIG. 13, first, the control unit 11 receives a keyword command registration request (S120). This registration request is received with the user ID. This registration request includes keyword information set by the user, and a plurality of pieces of command information selected by the user.

When the registration request is received, the control unit 11 accesses the keyword command table T2 of the user and registers the plurality of pieces of command information selected by the user in association with the keyword set by the user in the keyword command table T2 (S122).

Figure 14:
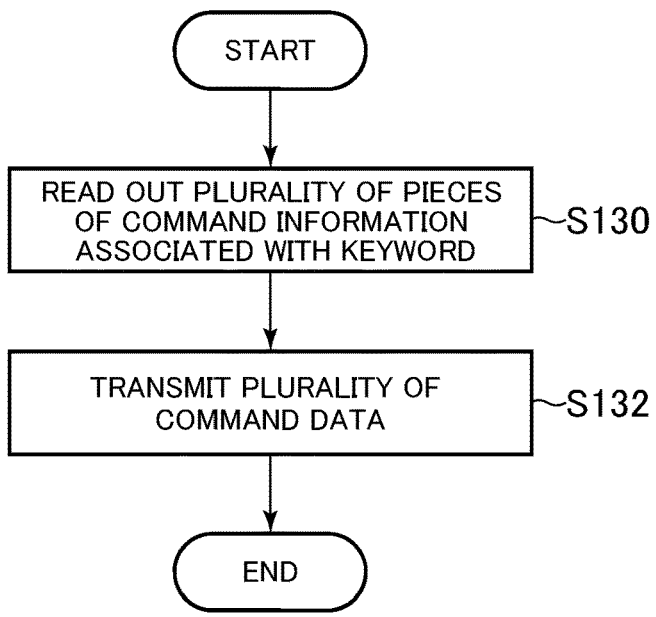
FIG. 14 is a view showing another processing executed in the apparatus control system.

[3-5] FIG. 14 shows an example of the processing executed when an operation instruction including a keyword is transmitted with the user ID to the command data transmission device 10.

As shown in FIG. 14, first, the control unit 11 reads out a plurality of pieces of command information associated with the keyword, referring to the keyword command table T2 of the user (S130). The control unit 11 then acquires a plurality of command data based on the plurality of pieces of command information, and transmits the plurality of command data (S132). The command data transmission processing is executed similarly to Step S108.

[4. Summary] In the apparatus control system 1 described above, the apparatuses 20, each having a private IP address set thereon, can be controlled via the internet 6. Consequently, the user can give an operation instruction to the apparatuses 20, for example, using a service (speech recognition service or the like) provided via the internet 6.

Further, in the apparatus control system 1, a command that is originally used to control the apparatuses 20 via the LAN 2 can also be used to control the apparatuses 20 via the internet 6. Consequently, there is no need to define separate commands.

Moreover, in the apparatus control system 1, not all the apparatuses 20 need not be in the state of being able to receive command data from the command data transmission device 10. If at least one apparatus 20 is in the state of being able to receive command data from the command data transmission device 10, a command can be transmitted to another apparatus 20 via the one apparatus 20 (substitute apparatus).

Further, in the apparatus control system 1, a plurality of command data to one apparatus 20 or a plurality of command data to a plurality of apparatuses 20 can be transmitted together in one data (packet) (see FIG. 7). Consequently, it is possible to perform a plurality of controls to one apparatus 20 at a time or to control a plurality of apparatuses 20 simultaneously. It is also possible to quickly send and receive a plurality of command data or to reduce the amount of packets.

Moreover, in the apparatus control system 1, since the wait time data is inserted, the time from the execution of one command to the execution of the next command can be adjusted. For example, when a command to activate an apparatus 20 from the standby state is executed, the next command can be executed after the activation of the apparatus 20 is completed.

Further, in the apparatus control system 1, the two topics of the first topic TP1 and the second topic TP2 are provided in the MQTT server 70 and these are properly used for different purposes. Thus, data transmission from the command data transmission device 10 to an apparatus 20 and data transmission from the apparatus 20 to the command data transmission device 10 can be carried out. Consequently, for example, the command data transmission device 10 can acquire the apparatus information of the apparatus 20.

[5. Modifications] The invention is not limited to the above embodiment.

[5-1] The above description is mostly on the assumption that the first apparatus 20-1, the second apparatus 20-2, the third apparatus 20-3, and the fourth apparatus 20-4 are an AV receiver, electronic piano, television receiver, or Blu-ray disc player. However, the apparatus 20 to be a target of control by the apparatus control system 1 is not limited to these. The apparatus 20 may be an audio apparatus or audio-visual apparatus other than the AV receiver, television receiver, and Blu-ray disc player, or may be a musical instrument other than the electronic piano (musical instrument having a network function such as an electronic organ or guitar). An audio apparatus, audio-visual apparatus or musical instrument having a network communication function can be a target of control by the apparatus control system 1. The apparatus 20 may also be other apparatuses than the audio apparatus, audio-visual apparatus or musical instrument. An apparatus having a network communication function can be a target of control by the apparatus control system 1.

Further, the local area device which receives command data from the command data transmission device 10 may be a device other than the apparatus 20 to be a target of control by the apparatus control system 1. For example, the local area device may be a network apparatus such as a router, switch, or wireless communication access point.

[5-2] The voice input device 30 simply needs to be connected to the internet 6 and need not be connected to the LAN 2 to which the apparatus 20 is connected.

[5-3] In the above embodiment, the user inputs an operation instruction for the apparatus 20 to the voice input device 30. However, an operation instruction need not be given as an audio input. For example, the user may be allowed to input an operation instruction by selecting a button displayed on the screen of the terminal.

[5-4] When command data representing a command to the first apparatus 20-1 is transmitted to the first apparatus 20-1, the designation of the item "ip" may be omitted. If the item "ip" is omitted, the first apparatus 20-1 may use its own IP address (192.168.0.2) or 127.0.0.1.

[5-5] If the LAN 2 includes both a wired LAN and a wireless LAN, one of the LANs may be preferentially used according to the apparatus 20 at the destination of the command.

[5-6] In the above embodiment, a command is transmitted via the LAN 2. However, a command may be transmitted via a transmission method other than the LAN 2. For example, a command maybe transmitted via wireless communication other than wireless LAN, such as Bluetooth (trademark registered), or may be transmitted via a cable other than a LAN cable, such as an HDMI cable. In this case, the "local area" is an area where communication is available via the wireless communication or the cable.

Further, a command is not limited to the above-described format (see FIG. 2) and may be in other formats. Command data is not limited to the above-described format (see FIGS. 5, 7, 8), either, and may be in other formats. That is, a command need not use the HTTP protocol.

[5-6-1] For example, a command using Wake-on-LAN may be employed. For example, if the second apparatus 20-2 supports the Wake-on-LAN function, a magic packet (equivalent to a command) in which the MAC address of the second apparatus 20-2 is repeated 16 times may be transmitted from the first apparatus 20-1 to the second apparatus 20-2, thus starting up the second apparatus 20-2 from the first apparatus 20-1. The same applied to the case of starting up the third apparatus 20-3 or the fourth apparatus 20-4 from the first apparatus 20-1. In this case, a field showing whether the apparatus 20 supports the Wake-on-LAN function or not may be provided in the apparatus table T1, thus enabling the determination of whether each apparatus 20 supports the Wake-on-LAN function or not.

[5-6-2] Further, for example, since the third apparatus 20-3 (television receiver) and the fourth apparatus 20-4 (Blu-ray disc player) are connected to the first apparatus 20-1 (AV receiver) via an HDMI cable, a command to the third apparatus 20-3 or the fourth apparatus 20-4 may be transmitted via the HMDI cable. Specifically, a command to the third apparatus 20-3 or the fourth apparatus 20-4 may be transmitted, using the CEC (Consumer Electronics Control) function defined by the HDMI standard.

It is now assumed that an operation instruction "X watch TV" to the effect that a television broadcast is to be viewed on a television receiver made by company X is inputted to the voice input device 30. In this case, command data to activate the third apparatus 20-3 (television receiver) is transmitted to the first apparatus 20-1 (substitute apparatus of the third apparatus 20-3; see FIG. 3). A command to activate the third apparatus 20-3 is executed to the third apparatus 20-3 from the first apparatus 20-1. In this case, an ON command (activation command) complying with the CEC function may be transmitted via an HDMI cable. That is, the command transmitting unit 220 of the first apparatus 20-1 may output the command to the first HDMI terminal (HDMI1) to which the third apparatus 20-3 is connected. Further, when other operation instructions related to the television receiver are inputted to the voice input device 30, commands complying with the CEC function may be similarly transmitted from the first apparatus 20-1 to the third apparatus 20-3 via the HDMI cable. For example, when an operation instruction "X turn off TV" to the effect that the television receiver is to be turned OFF (into the standby state) is inputted to the voice input device 30, an OFF command complying with the CEC function may be transmitted from the first apparatus 20-1 to the third apparatus 20-3 via the HDMI cable.

Further, it is now assumed that an operation instruction "X watch BD" to the effect that a video reproduced by a Blu-ray disc player made by company X to be viewed is inputted to the voice input device 30. In this case, command data to cause the fourth apparatus 20-4 (Blu-ray disc player) to reproduce content is transmitted to the first apparatus 20-1 (substitute apparatus of the fourth apparatus 20-4; see FIG. 3). A command to cause the fourth apparatus 20-4 to reproduce the content is executed to the fourth apparatus 20-4 from the first apparatus 20-1. In this case, a PLAY command (reproduction command) complying with the CEC function may be transmitted via an HDMI cable. That is, the command transmitting unit 220 of the first apparatus 20-1 may output the command to the second HDMI terminal (HDMI2) to which the fourth apparatus 20-4 is connected. Further, when other operation instructions (start, end, stop, skip or the like) related to the Blu-ray disc player are inputted to the voice input device 30, commands (ON, OFF, STOP, SKIP or the like) complying with the CEC function may be similarly transmitted from the first apparatus 20-1 to the fourth apparatus 20-4 via the HDMI cable.

In the above case, a "control type" field showing the control type may be provided in the apparatus table T1, thus enabling the specification of which of the LAN 2 and the HDMI cable is to be used to control each apparatus 20. For example, for the television receiver and the Blu-ray disc player controlled via the HDMI cable, "CEC_TV" and "CEC_BD" or the like may be registered in the "control type" field, thus enabling the specification that these apparatuses 20 are controlled by commands complying with the CEC function. Further, an instruction to execute a command complying with the CEC function may be added to a command that is originally used to control the apparatuses 20 via the LAN 2. For example, in the case of causing the first apparatus 20-1 to carry out an operation of outputting an ON command conforming to the CEC function to the first HDMI terminal (HDMI1), a command such as "http://192.168.0.2/ctrl?CEC_ON:HDMI1" may be executed.

[5-6-3] Further, for example, regarding an apparatus 20 that can be controlled with a remote controller, command data including a code to be transmitted from the remote controller via infrared communication may be generated and transmitted. It is now assumed that an operation instruction "X watch TV" to the effect that a television broadcast is to be viewed on a television receiver made by company X is inputted to the voice input device 30. In this case, command data including a code to be transmitted when starting up the third apparatus 20-3 (television receiver) with the remote controller is transmitted to the first apparatus 20-1 (substitute apparatus of the third apparatus 20-3; see FIG. 3). A command to activate the third apparatus 20-3 is executed to the third apparatus 20-3 from the first apparatus 20-1. In this case, the first apparatus 20-1 may transmit the code via the LAN 2 or infrared communication or the like.

[5-7] In the embodiment described above, the second apparatus 20-2 does not receive command data representing a command to the second apparatus 20-2 (for example, the command data D2), and the first apparatus 20-1 receives the command data instead. However, if the second apparatus 20-2 is connected to the internet 6, the second apparatus 20-2 itself may receive the command data D2. In this case, the destination of the command data D2 simply needs to be changed from the first apparatus 20-1 to the second apparatus 20-2, without having to change the content of the command data D2. Also, in this case, two topics for the second apparatus 20-2 (for example, topics with names based on the MAC address of the second apparatus 20-2) may be set in the MQTT server 70, separately from the first topic TP1 and the second topic TP2, which are topics for the first apparatus 20-1. The second apparatus 20-2 may receive command data from the command data transmission device 10 via one of those topics and transmit apparatus information or the like to the command data transmission device 10 via the other of those topics. The same applies to the third apparatus 20-3 and the fourth apparatus 20-4.

[5-8] Boot information showing the apparatus 20 is started up and connected to the network, shutdown information showing that the apparatus 20 is shut down and disconnected from the network, and error information showing that an error has occurred in the network connection of the apparatus 20 may be transmitted to command processing system 50 (command data transmission device 10) from the apparatus 20 via the MQTT server 70. The command processing system 50 (command data transmission device 10) may manage the state of the apparatus 20, based on the above information.

[5-9] In the embodiment described above, command data is transmitted by a method using the MQTT protocol. However, other methods may be employed. For example, command data may be registered in a server, and the apparatus 20 may access the server and thus download the command data registered in the server.

[6. Supplementary Notes] As can be recognized from the description with respect to the embodiments explained above, in this specification, various technical ideas are disclosed that include the invention described below.

A command data transmission device according to one embodiment of the invention includes: at least one processor; and at least one memory that stores a plurality of instructions, which when executed by the at least one processor, cause the at least one processor to: receive an operation instruction to an apparatus installed in a local area; generate command data representing a command to be transmitted to the apparatus to cause the apparatus in order to perform an operation corresponding to the operation instruction and an address for transmitting the command to the apparatus via a transmission method in the local area; and transmit the generated command data to a local area device installed in the local area via a wide area network.

A local area device according to one embodiment of the invention includes: at least one processor; and at least one memory that stores a plurality of instructions, which when executed by the at least one processor, cause the at least one processor to:

receive command data via a wide area network, the command data representing an address to which a command is to be transmitted via a transmission method in a local area and the command to be transmitted to the address via the transmission method; and transmit the command to the address via the transmission method, based on the command data.

An apparatus control system according to one embodiment of the invention includes: a command data transmission device capable of transmitting command data via a wide area network, the command data transmission device being configured to: receive an operation instruction to an apparatus installed in a local area; generate command data based on the operation instruction, the command data representing a command to be transmitted to the apparatus in order to cause the apparatus to perform an operation corresponding to the operation instruction and an address for transmitting the command to the apparatus via a transmission method in the local area; and transmit the generated command data to a local area device installed in the local area via a wide area network; and the local area device being configured to: receive the command data via the wide area network; and transmit the command to the address via the transmission method, based on the command data.

A method for controlling a command data transmission device according to one embodiment of the invention includes: receiving an operation instruction to an apparatus installed in a local area; generating command data based on the operation instruction, the command data representing a command to be transmitted to the apparatus in order to cause the apparatus to perform an operation corresponding to the operation instruction and an address for transmitting the command to the apparatus via a transmission method in the local area; and transmitting the generated command data to a local area device installed in the local area via a wide area network.

A method for controlling a local area device according to one embodiment of the invention includes: receiving command data via a wide area network, the command data representing an address to which a command is to be transmitted via a transmission method in a local area and the command to be transmitted to the address via the transmission method; and transmitting the command to the address via the transmission method, based on the command data.

An apparatus control method according to one embodiment of the invention includes: receiving, by a command data transmission device, an operation instruction to an apparatus installed in a local area; and generating, by the command data transmission device, command data based on the operation instruction, the command data representing a command to be transmitted to the apparatus in order to cause the apparatus to perform an operation corresponding to the operation instruction and an address for transmitting the command to the apparatus via a transmission method in the local area; transmitting, by the command data transmission device, the generated command data to a local area device installed in the local area via a wide area network; receiving, by the local area device, the command data via the wide area network; and transmitting, by the local area device, the command to the address via the transmission method, based on the command data.

A program according to one embodiment of the invention causes a computer to: receive an operation instruction to an apparatus installed in a local area; generate command data based on the operation instruction, the command data representing a command to be transmitted to the apparatus in order to cause the apparatus to perform an operation corresponding to the operation instruction and an address for transmitting the command to the apparatus via a transmission method in the local area; and transmit the generated command data to a local area device installed in the local area via a wide area network. An information storage medium according to one embodiment of the invention is a non-transitory computer-readable information storage medium in which the above program is recorded.

A program according to one embodiment of the invention causes a computer to: receive command data via a wide area network, the command data representing an address to which a command is to be transmitted via a transmission method in a local area and the command to be transmitted to the address via the transmission method; and transmit the command to the address via the transmission method, based on the command data. An information storage medium according to one embodiment of the invention is a non-transitory computer-readable information storage medium in which the above program is recorded.

According to the invention, it is possible to control of an apparatus via a wide area network such as the internet, using a commanded used in a local area.

According to one embodiment of the invention, the plurality of instructions may cause the at least one processor to: determine, based on information about an apparatus of a target of the operation instruction, whether the apparatus of the target of the operation instruction can receive data via the wide area network; and regard the apparatus of the target of the operation instruction as the local area device and transmit the command data to the apparatus of the target of the operation instruction via the wide area network, if the apparatus of the target of the operation instruction can receive information via the wide area network.

According to one embodiment of the invention, the information about the apparatus of the target of the operation instruction may include substitute apparatus information about a substitute apparatus which receives data via the wide area network, instead of the apparatus of the target of the operation instruction, and the plurality of instructions may cause the at least one processor to regard the substitute apparatus as the local area device and transmit the command data to the substitute apparatus via the wide area network, if the apparatus of the target of the operation instruction cannot receive data via the wide area network.

According to one embodiment of the invention, the plurality of instructions may cause the at least one processor to generate a plurality of command data based on the operation instruction.

According to one embodiment of the invention, the plurality of instructions may cause the at least one processor to put together the plurality of command data into one data and transmit the data.

According to one embodiment of the invention, the plurality of instructions may cause the at least one processor to generate: first command data representing a first command, wait time data representing a wait time to be provided until a second command is transmitted after the first command is transmitted, and second command data representing the second command.

According to one embodiment of the invention, the plurality of command data may represent a plurality of commands to be transmitted to one apparatus in order to cause the apparatus to perform the operation corresponding to the operation instruction.

According to one embodiment of the invention, the operation instruction may be to give an instruction that a specific operation is to be performed, and the plurality of command data may includes: command data representing a command to activate the apparatus, and command data representing a command to cause the apparatus to perform the specific operation.

According to one embodiment of the invention, the plurality of instructions may cause the at least one processor to: determine whether the apparatus is in an active state or not, based on current state information showing a current state of the apparatus; and include the command data representing the command to activate the apparatus in the plurality of command data, if the apparatus is not in the active state.

According to one embodiment of the invention, the plurality of command data may represent a command to be transmitted to each of a plurality of apparatuses in order to cause each of the plurality of apparatuses to perform an operation corresponding to the operation instruction, and an address for transmitting the command to each of the plurality of apparatuses via the transmission method.

According to one embodiment of the invention, the plurality of instructions may cause the at least one processor to specify, if the operation instruction is to a first apparatus, a second apparatus which needs to operate when the first apparatus is made to perform the operation corresponding to the operation instruction, and the plurality of command data may include: command data representing a command to be transmitted to the first apparatus and an address for transmitting the command to the first apparatus via the transmission method, and command data representing a command to be transmitted to the second apparatus and an address for transmitting the command to the second apparatus via the transmission method.

According to one embodiment of the invention, the operation instruction may be to give an instruction that a sound signal outputted from the first apparatus is emitted from a sound emitter, the second apparatus may be an apparatus which is connected to a plurality of apparatuses and for causing the sound emitter to emit a sound signal inputted from each of the plurality of apparatuses, and the plurality of command data may include: command data representing a command to cause the second apparatus to switch the sound signal emitted from the sound emitter to a sound signal inputted from the first apparatus, and command data representing a command to cause the first apparatus to start outputting the sound signal.

According to one embodiment of the invention, the plurality of instructions may cause the at least one processor to: determine whether the apparatus is in a first state or not, based on current state information showing a current state of the apparatus; and transmit the command data representing a command to change the apparatus from the first state to a second state, if the apparatus is in the first state.

According to one embodiment of the invention, the plurality of instructions may cause the at least one processor to: generate the command data representing a command to cause the apparatus to send back current state information showing a current state of the apparatus and an address for transmitting the command to the apparatus via the transmission method, and transmit the generated command data to the local area device via the wide area network; and receive the current state information from the local area device via the wide area network, the current state information being sent back to the local area device in response to the command transmitted to the address by the local area device via the transmission method.

According to one embodiment of the invention, the plurality of instructions may cause the at least one processor to transmit the command data to the local area device, using an MQTT (message queueing telemetry transport) protocol.

According to one embodiment of the invention, the plurality of instructions may cause the at least one processor to: transmit the command data to the local area device, using a first topic complying with the MQTT protocol; and receive the current state information from the local area device, using a second topic complying with the MQTT protocol and different from the first topic.

According to one embodiment of the invention, the plurality of instructions may cause the at least one processor to: regard, if the apparatus of the target of the operation instruction is not specified and only one apparatus is installed in the local area, the one apparatus as the target of the operation instruction; and inquire of a user about the apparatus of the target of the operation instruction, if the apparatus of the target of the operation instruction is not specified and a plurality of apparatuses is installed in the local area.

According to one embodiment of the invention, the operation instruction may be generated based on a voice inputted via a voice input device.

According to one embodiment of the invention, the plurality of instructions may cause the at least one processor to: determine, if the operation instruction includes a designation about volume of sound emitted from a sound emitter, whether the designated volume is higher than a reference volume or not; and notify a user, if the designated volume is higher than the reference volume.

According to one embodiment of the invention, the apparatus may perform an operation corresponding to a code transmitted from a remote controller, and the plurality of instructions may cause the at least one processor to generate command data representing a command including the code, and an address for transmitting the command to the apparatus via the transmission method.

According to one embodiment of the invention, the plurality of instructions may cause the at least one processor to: register a plurality of pieces of command information in association with one piece of identification information in a storage, in response to a registration request from a user; and acquire a plurality of command data, based on the plurality of pieces of command information associated with the identification information, when the operation instruction including the identification information is received.

According to one embodiment of the invention, the apparatus may receive the command transmitted via the transmission method and perform an operation corresponding to the command, and the local area device may be a device capable of receiving data via the wide area network and capable of transmitting the command to the address via the transmission method.

According to one embodiment of the invention, the address may be the local area device.

According to one embodiment of the invention, the local area device may be an audio apparatus.

According to one embodiment of the invention, the local area device maybe an electronic piano having an automatic performance function.

While there have been described what are at present considered to be certain embodiments of the invention, it will be understood that various modifications maybe made thereto, and it is intended that the appended claims cover all such modifications as fall within the true spirit and scope of the invention.

What is claimed is:

1. A command data transmission method executed by a computer, the command data transmission method comprising:

receiving an operation instruction to an apparatus installed in a local area;

generating command data representing a command to be transmitted to the apparatus to cause the apparatus in order to perform an operation corresponding to the operation instruction and an address for transmitting the command to the apparatus via a transmission in the local area;

transmitting the generated command data to a local area device installed in the local area via a wide area network, determining, based on information about an apparatus of a target of the operation instruction, whether the apparatus of the target of the operation instruction can receive data via the wide area network, and wherein the apparatus of the target of the operation instruction is regarded as the local area device and the command data is transmitted to the apparatus of the target of the operation instruction via the wide area network, if the apparatus of the target of the operation instruction can receive information via the wide area network.

2. The command data transmission method according to claim 1, wherein the information about the apparatus of the target of the operation instruction includes substitute apparatus information about a substitute apparatus which receives data via the wide area network, instead of the apparatus of the target of the operation instruction, and the substitute apparatus is regarded as the local area device and the command data is transmitted to the substitute apparatus via the wide area network, if the apparatus of the target of the operation instruction cannot receive data via the wide area network.

3. A command data transmission method executed by a computer, the command data transmission method comprising:

receiving an operation instruction to an apparatus installed in a local area;

generating command data representing a command to be transmitted to the apparatus to cause the apparatus in order to perform an operation corresponding to the operation instruction and an address for transmitting the command to the apparatus via a transmission in the local area; and transmitting the generated command data to a local area device installed in the local area via a wide area network, determining whether the apparatus is in a first state or not, based on current state information showing a current state of the apparatus; and wherein the command data representing a command to change the apparatus from the first state to a second state is transmitted to the local area device, if the apparatus is in the first state.

4. A command data transmission method executed by a computer, the command data transmission method comprising:

receiving an operation instruction to an apparatus installed in a local area;

generating command data representing a command to be transmitted to the apparatus to cause the apparatus in order to perform an operation corresponding to the operation instruction and an address for transmitting the command to the apparatus via a transmission in the local area; and transmitting the generated command data to a local area device installed in the local area via a wide area network, wherein the command data representing a command to cause the apparatus to send back current state information showing a current state of the apparatus and an address for transmitting the command to the apparatus via the transmission in the local area is generated, and the generated command data is transmitted to the local area device via the wide area network; and the command data transmission method further comprises receiving the current state information from the local area device via the wide area network, the current state information being sent back to the local area device in response to the command transmitted to the address by the local area device via the transmission in the local area.

5. The command data transmission method according to claim 4, wherein the command data is transmitted to the local area device, using a first topic complying with the MQTT protocol; and the current state information is received from the local area device, using a second topic complying with the MQTT protocol and different from the first topic.

6. A command data transmission method executed by a computer, the command data transmission method comprising:

receiving an operation instruction to an apparatus installed in a local area;

generating command data representing a command to be transmitted to the apparatus to cause the apparatus in order to perform an operation corresponding to the operation instruction and an address for transmitting the command to the apparatus via a transmission in the local area; and transmitting the generated command data to a local area device installed in the local area via a wide area network, wherein, if the apparatus of the target of the operation instruction is not specified and only one apparatus is installed in the local area, the one apparatus is regarded as the target of the operation instruction; and the command data transmission method further comprises inquiring of a user about the apparatus of the target of the operation instruction, if the apparatus of the target of the operation instruction is not specified and a plurality of apparatuses is installed in the local area.

7. A command data transmission method executed by a computer, the command data transmission method comprising:

receiving an operation instruction to an apparatus installed in a local area;

generating command data representing a command to be transmitted to the apparatus to cause the apparatus in order to perform an operation corresponding to the operation instruction and an address for transmitting the command to the apparatus via a transmission in the local area; and transmitting the generated command data to a local area device installed in the local area via a wide area network, registering a plurality of pieces of command information in association with one piece of identification information in a storage, in response to a registration request from a user; and acquiring a plurality of command data, based on the plurality of pieces of command information associated with the identification information, when the operation instruction including the identification information is received.

8. The command data transmission method according to claim 1, 3, 4, 6 or 7, wherein the apparatus receives the command transmitted via the transmission in the local area and perform an operation corresponding to the command, and the local area device is a device capable of receiving data via the wide area network and capable of transmitting the command to the address via the transmission in the local area.

9. The command data transmission method according to claim 1, 3, 4, 6 or 7, wherein a plurality of command data is generated based on the operation instruction.

10. The command data transmission method according to claim 9, wherein
the plurality of command data represents a command to be transmitted to each of a plurality of apparatuses in order to cause each of the plurality of apparatuses to perform an operation corresponding to the operation instruction, and an address for transmitting the command to each of the plurality of apparatuses via the transmission in the local area.

11. The command data transmission method according to claim 9, wherein
the plurality of command data represents a plurality of commands to be transmitted to one apparatus in order to cause the apparatus to perform the operation corresponding to the operation instruction.

12. The command data transmission method according to claim 11, wherein
the operation instruction is to give an instruction that a specific operation is to be performed, and
the plurality of command data includes:
command data representing a command to activate the apparatus, and
command data representing a command to cause the apparatus to perform the specific operation.

13. The command data transmission method according to claim 12, further comprising:
determining whether the apparatus is in an active state or not, based on current state information showing a current state of the apparatus; and
wherein the command data representing the command to activate the apparatus is included in the plurality of command data, if the apparatus is not in the active state.

14. The command data transmission method according to claim 1, 3, 4, 6 or 7, wherein
the command data is transmitted to the local area device, using an MQTT (message queueing telemetry transport) protocol.

15. The command data transmission method according to claim 1, 3, 4, 6 or 7, wherein
the operation instruction is generated based on a voice inputted via a voice input device.

16. The command data transmission method according to claim 15, further comprising:
determining, if the operation instruction includes a designation about volume of sound emitted from a sound emitter, whether the designated volume is higher than a reference volume or not; and
notifying a user, if the designated volume is higher than the reference volume.

17. The command data transmission method according to claim 1, 3, 4, 6 or 7, wherein
the apparatus performs an operation corresponding to a code transmitted from a remote controller, and
the command data representing a command including the code, and an address for transmitting the command to the apparatus via the transmission in the local area is generated.

18. A local area device comprising:
at least one processor; and
at least one memory that stores a plurality of instructions, which when executed by the at least one processor, cause the at least one processor to:
receive command data via a wide area network, the command data representing an address to which a command is to be transmitted via a transmission in a local area and the command to be transmitted to the address via the transmission in the local area;
transmit the command to the address via the transmission in the local area, based on the command data;
determine, based on information about an apparatus of a target of an operation instruction, whether the apparatus of the target of the operation instruction can receive data via the wide area network, and
wherein the apparatus of the target of the operation instruction is regarded as the local area device and the command data is transmitted to the apparatus of the target of the operation instruction via the wide area network, if the apparatus of the target of the operation instruction can receive information via the wide area network.

19. A local area device comprising:
at least one processor; and
at least one memory that stores a plurality of instructions, which when executed by the at least one processor, cause the at least one processor to:
receive command data via a wide area network, the command data representing an address to which a command is to be transmitted via a transmission in a local area and the command to be transmitted to the address via the transmission in the local area;
transmit the command to the address via the transmission in the local area, based on the command data;
determine whether an apparatus is in a first state or not, based on current state information showing a current state of the apparatus; and
wherein the command data representing a command to change the apparatus from the first state to a second state is transmitted to the local area device, if the apparatus is in the first state.

20. A local area device comprising:
at least one processor; and
at least one memory that stores a plurality of instructions, which when executed by the at least one processor, cause the at least one processor to:
receive command data via a wide area network, the command data representing an address to which a command is to be transmitted via a transmission in a local area and the command to be transmitted to the address via the transmission in the local area;
transmit the command to the address via the transmission in the local area, based on the command data,
wherein the command data represents a command to cause an apparatus to send back current state information showing a current state of the apparatus and an address for transmitting the command to the apparatus via the transmission in the local area is generated, and the generated command data is transmitted to the local area device via the wide area network; and
receive the current state information from the local area device via the wide area network, the current state information being sent back to the local area device in response to the command transmitted to the address by the local area device via the transmission in the local area.

21. A local area device comprising:
at least one processor; and
at least one memory that stores a plurality of instructions, which when executed by the at least one processor, cause the at least one processor to:
receive command data via a wide area network, the command data representing an address to which a command is to be transmitted via a transmission in a local area and the command to be transmitted to the address via the transmission in the local area;

transmit the command to the address via the transmission in the local area, based on the command data, wherein, if an apparatus of the target of an operation instruction is not specified and only one apparatus is installed in the local area, the one apparatus is regarded as the target of the operation instruction; and inquire of a user about the apparatus of the target of the operation instruction, if the apparatus of the target of the operation instruction is not specified and a plurality of apparatuses is installed in the local area.

22. A local area device comprising:

at least one processor; and at least one memory that stores a plurality of instructions, which when executed by the at least one processor, cause the at least one processor to:

receive command data via a wide area network, the command data representing an address to which a command is to be transmitted via a transmission in a local area and the command to be transmitted to the address via the transmission in the local area;

transmit the command to the address via the transmission in the local area, based on the command data, register a plurality of pieces of command information in association with one piece of identification information in a storage, in response to a registration request from a user; and acquire a plurality of command data, based on the plurality of pieces of command information associated with the identification information, when an operation instruction including the identification information is received.

* * * * *